(12) United States Patent
Moeller

(10) Patent No.: US 10,753,728 B2
(45) Date of Patent: Aug. 25, 2020

(54) OPTICAL METHOD TO MEASURE THE THICKNESS OF COATINGS DEPOSITED ON SUBSTRATES

(71) Applicant: Arkema Inc., King of Prussia, PA (US)

(72) Inventor: Gunter E. Moeller, Collegeville, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 16/065,839

(22) PCT Filed: Jan. 4, 2017

(86) PCT No.: PCT/US2017/012086
§ 371 (c)(1),
(2) Date: Jun. 25, 2018

(87) PCT Pub. No.: WO2017/120160
PCT Pub. Date: Jul. 13, 2017

(65) Prior Publication Data
US 2019/0011252 A1 Jan. 10, 2019

Related U.S. Application Data

(60) Provisional application No. 62/275,905, filed on Jan. 7, 2016.

(51) Int. Cl.
*G01B 11/06* (2006.01)
*B05C 21/00* (2006.01)
(Continued)

(52) U.S. Cl.
CPC .......... *G01B 11/0633* (2013.01); *B05C 21/00* (2013.01); *G01B 11/0625* (2013.01);
(Continued)

(58) Field of Classification Search
CPC ..... G01B 11/0633; G01B 21/08; B05C 21/00; G01J 3/42; G01N 21/27
(Continued)

(56) References Cited

U.S. PATENT DOCUMENTS 4,461,576 A 7/1984 King
4,651,568 A 3/1987 Reich et al.
(Continued)

FOREIGN PATENT DOCUMENTS

EP 0 443 322 A2 8/1991
EP 0 443 322 A3 8/1991
(Continued)

OTHER PUBLICATIONS https://www.keyence.com/products/sensor/photoelectric/cz-v20/applications/.
RGB Digital Fiberoptic Sensors CZ-V20 Series Keyence America pp. 1-5.

*Primary Examiner* — Isiaka O Akanbi
(74) *Attorney, Agent, or Firm* — Lynn B. Morreale

(57) ABSTRACT

Methods and apparatus for measuring a thickness of a coating on an object are provided. Light is directed toward the object at a predetermined location on the object such that a portion of the light interacts with the object. An image having at least two wavelength channels (e.g., color channels) is captured that is produced by the portion of the light interacting with the object. A relative shift is determined between each of the at least two wavelength channels, based on a histogram of each wavelength channel of the at least two wavelength channels. At least one of the thickness or an acceptability of the coating on the object is determined based on the determined relative shift.

22 Claims, 14 Drawing Sheets

(51) Int. Cl.
  *G01J 3/42* (2006.01)
  *G01B 21/08* (2006.01)
  *G01N 21/27* (2006.01)

(52) U.S. Cl.
  CPC .............. *G01B 21/08* (2013.01); *G01J 3/42* (2013.01); *G01N 21/27* (2013.01)

(58) Field of Classification Search
  USPC ........... 356/601–632, 237.2–237.6, 402, 636
  See application file for complete search history.

(56) References Cited

U.S. PATENT DOCUMENTS

| | | | |
|---|---|---|---|
| 5,208,645 A | 5/1993 | Inoue et al. | |
| 5,396,080 A * | 3/1995 | Hannotiau | G01B 11/0616 250/559.28 |
| 5,619,330 A | 4/1997 | Ehemann, Jr. et al. | |
| 5,991,018 A * | 11/1999 | Imaizumi | G01B 11/0616 356/237.1 |
| 6,252,237 B1 | 6/2001 | Ramthun et al. | |
| 6,392,756 B1 * | 5/2002 | Li | G01B 11/0641 356/369 |
| 6,515,293 B1 | 2/2003 | Jun et al. | |
| 6,646,752 B2 | 11/2003 | Chen et al. | |
| 7,259,857 B2 * | 8/2007 | Butterfield | H04N 1/00058 347/19 |
| 7,365,860 B2 | 4/2008 | Price | |
| 7,414,470 B2 | 8/2008 | Okazaki | |
| 7,414,740 B2 | 8/2008 | Wilke et al. | |
| 2003/0230719 A1 | 12/2003 | Shelly et al. | |
| 2004/0065841 A1 * | 4/2004 | Darr | G01B 11/0625 250/372 |
| 2008/0285840 A1 * | 11/2008 | Kawai | G01N 21/8851 382/141 |
| 2009/0039240 A1 * | 2/2009 | Van Nijnatten | G01B 11/0633 250/223 B |
| 2009/0148031 A1 | 6/2009 | Fukami | |
| 2010/0033735 A1 | 2/2010 | Sakai et al. | |
| 2013/0095577 A1 | 4/2013 | Milshtein | |
| 2013/0222575 A1 | 8/2013 | Numazu | |
| 2014/0119634 A1 | 5/2014 | Numazu | |
| 2015/0002852 A1 * | 1/2015 | de Groot | G01B 9/0209 356/491 |

FOREIGN PATENT DOCUMENTS

| | | |
|---|---|---|
| WO | WO 2004/065902 A1 | 8/2004 |
| WO | WO 2008/073212 A2 | 6/2008 |
| WO | WO 2012/078886 A2 | 6/2012 |

* cited by examiner

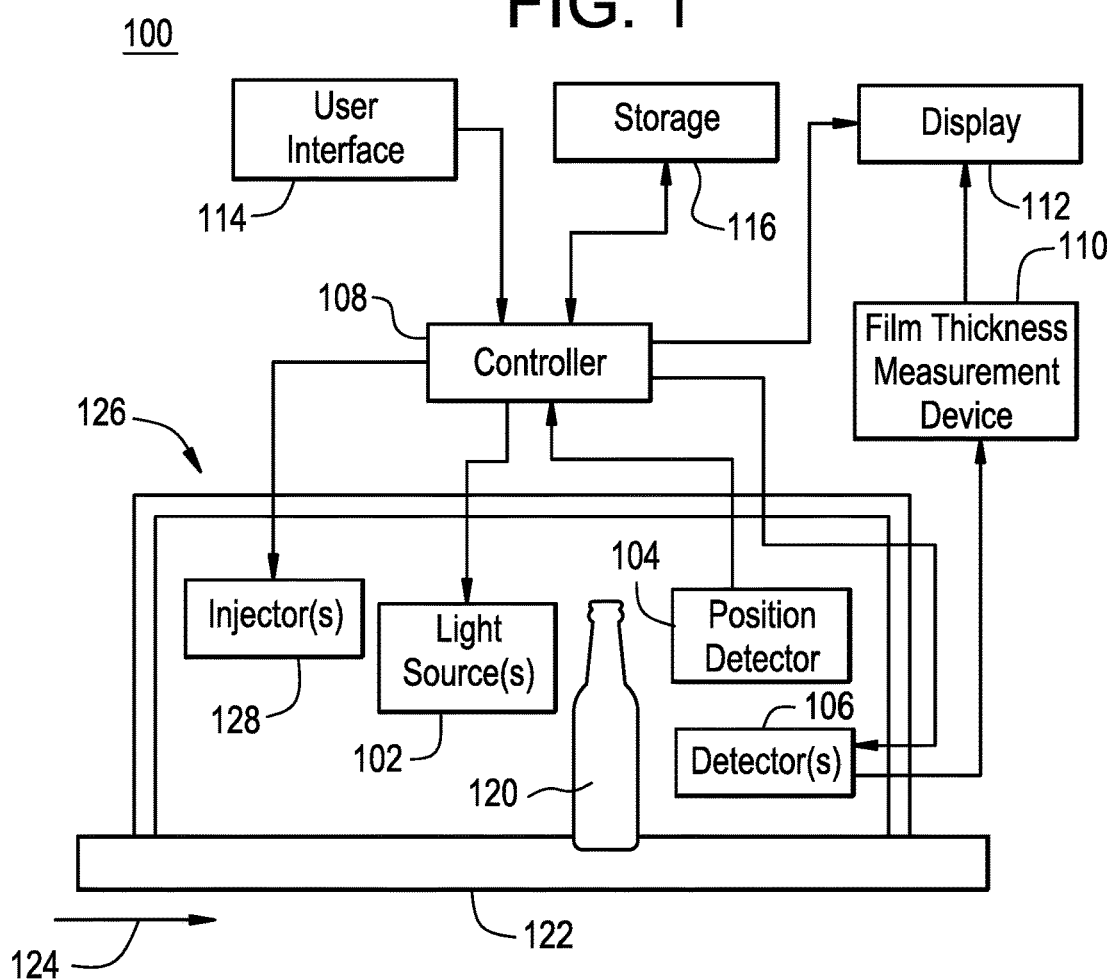
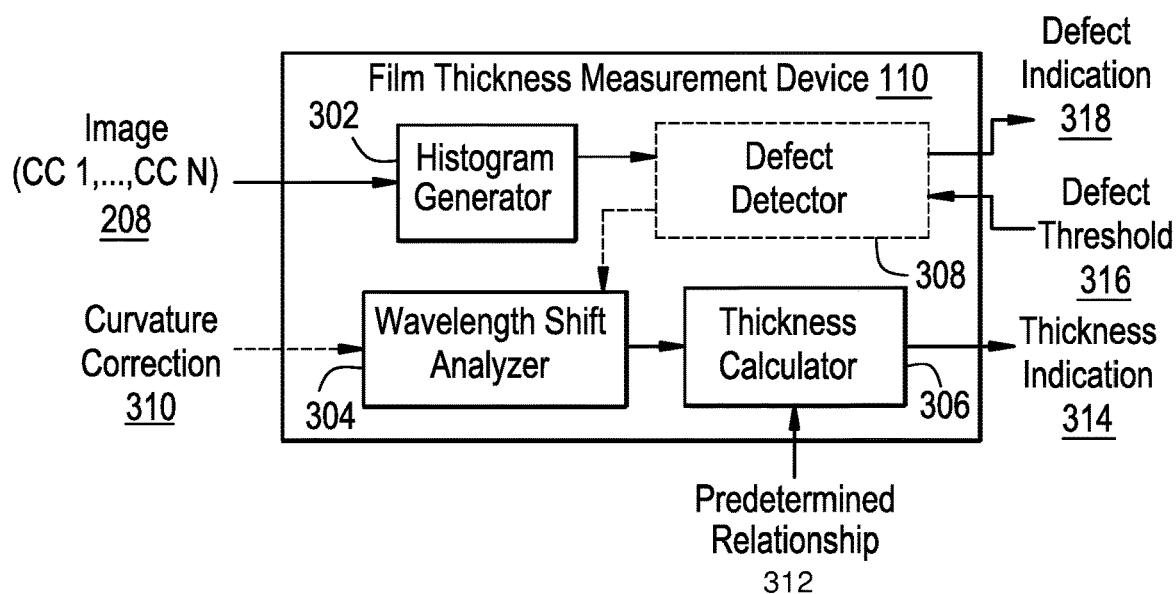

OPTICAL METHOD TO MEASURE THE THICKNESS OF COATINGS DEPOSITED ON SUBSTRATES

CROSS-REFERENCE TO RELATED APPLICATIONS

This application is a national stage application under 35 U.S.C. § 371 of PCT/US2017/012086 filed Jan. 4, 2017, which claims benefit to U.S. patent application Ser. No. 62/275,905, filed Jan. 7, 2016.

FIELD OF THE INVENTION

The present invention relates to methods and apparatus for optically measuring a thickness of a coating deposited on a substrate.

BACKGROUND OF THE INVENTION

During a glass container forming process, a metal-oxide coating is typically applied to the exterior of the glass container. Such coatings, may include tin, titanium, or other reactive metallic compounds, or organometallic compounds and may be employed to promote adhesion between the glass and a second protective coating, usually a wax, protecting the glass container from surface damage, such as abrasions and scratches.

The metal-oxide coating is typically applied when the glass container emerges in a heated, fully shaped condition from a glassware forming machine, that is at the "hot end" of the system. The containers are transported away from the forming machine by a conveyor. Temperatures in excess of 400 degrees Centigrade exist at the surface of the glass containers, so that when a heat decomposable inorganic metallic, or organometallic, compound is applied thereto, the compound reacts immediately and is converted to a metal-oxide coating.

It is desirable for the coating to be periodically inspected during the glass forming process. Current quality inspection procedures typically involve an offline process. One or more containers are periodically pulled from the production line, after the container has cooled down to less than about 100 degrees Centigrade (at the "cold end" of the system). The thickness of the metal-oxide coating is then measured to determine whether the thickness is within a thickness tolerance range. If the thickness is outside the tolerance range, all containers produced since the last successful inspection until the production process is corrected may be destroyed. For example, sample containers may be inspected every 4 to 8 hours. If there are about 400 to 500 bottles being formed per minute (or about 25,000 to about 55,000 bottles per hour), a coating deficiency identified after four hours of production may result in a significant loss of inventory.

Various methods exist for detecting defects in objects to be inspected.

U.S. Pat. No. 4,651,568 is directed to a glass bottle inspection method and apparatus that uses an acoustic wave pulse to detect defects.

U.S. Publication No. 2013/0222575 is directed to a glass bottle inspection apparatus and method that detects a defect on the glass bottle by an imaging process via one or plural illuminating units and at least one camera.

U.S. Publication No. 2014/0119634 is directed to a glass bottle inspection method and apparatus that produces differential images from images successively captured from the glass bottle while the bottle is rotated, to determine whether the bottle is defect free.

U.S. Publication No. 2009/0148031 is directed to a surface inspection apparatus which scans the surface of an inspection object with an inspection light, receives reflection light from the surface and generates a two-dimensional image of the object surface based on the reflection light. The apparatus classifies pixels in the two-dimensional image into pixels having tones corresponding to defects on the object surface and pixels having tones not corresponding to the defects.

Various methods exist for determining a coating thickness disposed on objects.

U.S. Publication No. 2004/0065841 is directed to a process and apparatus for testing the coating thickness on a plastic container by shining ultraviolet light through the container to one or more ultraviolet sensors and determining the thickness based on the amount of ultraviolet light passed through the container.

WO 2004/065902 is directed to a method and apparatus for contactless measurement of a coating on a substrate such as a bottle, based on capturing ultraviolet radiation reflected from the substrate.

U.S. Pat. No. 6,252,237 is directed to a method for measuring the thickness of a coating on a coated surface, using a solid state array of light-sensitive elements to measure light emitted from a fluorescing coating composition and measuring the intensity of the coating composition.

U.S. Pat. No. 6,646,752 is directed to a method and apparatus for measuring thicknesses of ultra-thin gate oxide layers, by using heat treatment and ellipsometry.

U.S. Pat. No. 5,208,645 is directed to a method and apparatus for measuring the thickness of a coating around a cylindrical object, by irradiating the object with parallel rays of light in a direction perpendicular to the specimen length and measuring the peak levels of the light intensity of light refracted from the specimen and received via an image detecting device.

U.S. Pat. No. 6,515,293 is directed to a method and apparatus of measuring the thickness of a thin layer formed on a semiconductor wafer by irradiating light onto cells of the wafer and measuring luminance values of light reflected from the wafer.

U.S. Pat. No. 5,991,018 is directed to an apparatus for inspecting a thickness or deteriorating situation of a coating layer using an image pickup unit to receive reflected light or transmission light. The image pickup signal is compared to a reference formula to determine the thickness of the coating. The inspecting apparatus may measure the thickness of the coating layer on the production line.

Current optical thickness measurement methods have difficulty providing accurate measurement of thin coating thicknesses (e.g., less than about 20 nm), as well as accurately identifying small changes in coating thickness, which may provide an indication that the thicknesses are approaching the edge of an acceptable tolerance range (e.g., less than about 5 nm). Accurate determination of the coating thickness at the "hot end" of the system during the in-line production process is also highly desirable, for example, to maintain the coating within the tolerance range and to reduce inventory loss.

SUMMARY OF THE INVENTION

An aspect of the present invention may be embodied in an apparatus for measuring a thickness of a coating on an object. The apparatus includes at least one light source, a detector and a measurement device coupled to the detector. The at least one light source is configured to direct light toward the object at a predetermined location on the object, such that a portion of the light interacts with the object. The detector is configured to capture an image having at least two wavelength channels (e.g., color channels) produced by the portion of the light that interacts with the object. The measurement device is configured to: determine a relative shift between each of the at least two wavelength channels based on a histogram of each wavelength channel of the at least two wavelength channels, and determine at least one of the thickness or an acceptability of the coating on the object based on the determined relative shift.

Another aspect of the present invention may be embodied in a method of measuring a thickness of a coating on an object. Light is directed toward the object at a predetermined location on the object such that a portion of the light interacts with the object. An image having at least two wavelength channels is captured that is produced by the portion of the light that interacts with the object. A relative shift is determined between each of the at least two wavelength channels, based on a histogram of each channel of the at least two wavelength channels. At least one of the thickness or an acceptability of the coating on the object is determined based on the determined relative shift.

DESCRIPTION OF THE DRAWINGS

The invention may be understood from the following detailed description when read in connection with the accompanying drawing. It is emphasized that, according to common practice, various features of the drawing may not be drawn to scale. On the contrary, the dimensions of the various features may be arbitrarily expanded or reduced for clarity. Moreover, in the drawing, common numerical references are used to represent like features. Included in the drawing are the following figures:

FIG. 1 is a functional block diagram of an example apparatus for measuring film thickness of a coating disposed on an object, according to an aspect of the present invention;

FIG. 3 is a functional block diagram of an example film thickness measurement device shown in FIG. 1, according to an aspect of the present invention;

DETAILED DESCRIPTION

Figure 2A:
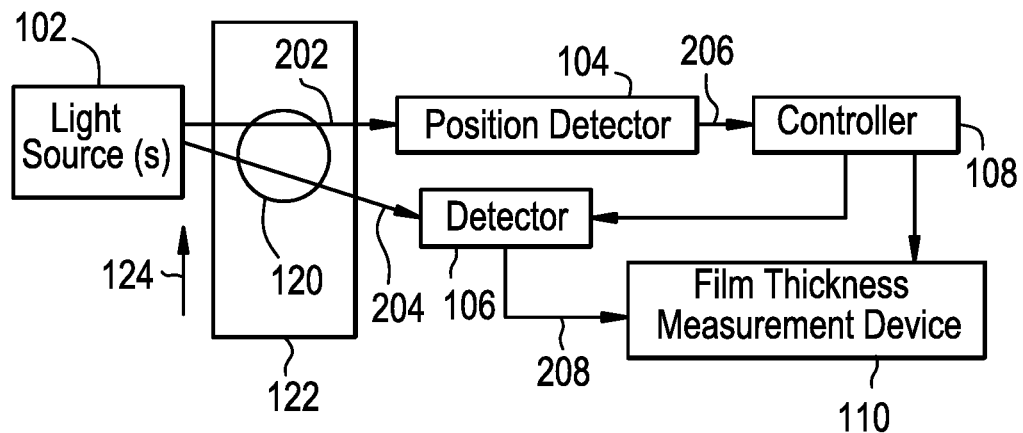
FIG. 2A is an overhead view diagram of a glass bottle and some of the components of the apparatus shown in FIG. 1, illustrating optical transmission measurement of a moving glass bottle, according to an aspect of the present invention.

Aspects of the invention relate to apparatus and methods of measuring a thickness of a film coating disposed on an object. The apparatus may include at least one light source, a detector, and a measurement device coupled to the detector. The light source(s) may be configured to direct light toward the object at a predetermined location on the object such that a portion of the light interacts with the object. The portion of the light that interacts with the object is referred to herein as interacting light. As used herein, the term portion of the light includes all of the light or less than all of the light (e.g., a percentage). The camera(s) may be configured to capture at least one image comprising at least two wavelength channels (e.g., color channels) produced by the interacting light. In some examples, the at least two channels includes three channels including, for example, red, green and blue color channels. The measurement device may determine a relative shift (e.g., a color shift) between each of the at least two wavelength channels, based on a histogram of each channel of the at least two wavelength channels. The measurement device may determine at least one of the thickness or an acceptability of the coating on the object based on the determined relative shift.

In some examples, the interacting portion of the light includes light passing through the object, such that the captured image is an optical transmission image. In some examples, the interacting portion of the light includes light reflected by the object, such that the captured image is an optical reflectance image. In some examples, the apparatus may be configured to capture an optical transmission image and/or an optical reflectance image. An optical transmission image (from light passing through the object) may be suitable for examples where the object is transparent to the light (such as transparent glass). An optical reflectance image (from light reflected by the object) may be suitable for examples where the object is at least partially absorbent to the light (such as amber glass). The light from the light source(s) may include visible light, infrared (IR) light or a combination thereof. In some examples, multiple images corresponding to plural locations on the object may be captured by the apparatus. The multiple images may be captured sequentially, simultaneously or a combination thereof. For example, a single light source may capture multiple images for plural locations as the object moves past the light source at a predetermined speed. As another example, multiple light sources may be positioned to direct light to plural locations on the object.

In some examples, the measurement device may take into consideration any curvature of the object when determining the relative color shift. In some examples, the measurement device may compare a characteristic of each color channel histogram to a defect threshold, and determine the coating thickness when the characteristic of each histogram is less than the defect threshold. The defect threshold may correspond to a dirt indication, a scratch indication and/or a weld-line indication.

In some examples, at least one of the thickness, an indication that the thickness is acceptable (e.g., within a predetermined range), or an indication that the thickness not acceptable (e.g., is out of the predetermined range) may be presented. In some examples, the apparatus may be configured to be part of a coating hood. In some examples, the thickness determined by the measurement device may be used to control a coating injector of the coating hood. Accordingly, in some examples, the apparatus may be used in the hot end of the object forming processing (i.e., during the time when the object surface still has a higher temperature prior to the application of a slow cooling period), upon disposing the coating on the object.

The invention is applicable to the common case of coating bottles using monobutylinchloride (MBTC); however, the apparatus described herein is applicable generally to the coating of glass with films of tin oxide, titanium oxide or other single metal oxide, or with a mixture thereof, using organometallic compounds, metal halides or other suitable compounds as the coating-chemical precursor.

The invention is applicable to transparent glass (i.e., transparent to visible light) and colored glass (i.e., partially light absorbing) and non-glass objects such as plastics. Non-limiting examples of colored glass include green-colored glass and amber-colored glass. Although the examples described herein relate to glass bottles, the apparatus is applicable generally to any glass object capable of being coating with a film. The object may be hollow (such as a bottle) or solid. The object may be symmetrical or asymmetrical.

An exemplary apparatus is described with reference to the individual figures. FIG. 1 is a functional block diagram illustrating apparatus 100 for measuring a film thickness of a coating on object 120. Apparatus 100 may include at least one light source 102, position detector 104, at least one detector 106, controller 108, film thickness measurement device 110 (also referred to herein as measurement device 110), display 112, user interface 114 and storage 116. Although not shown in FIG. 1, controller 108 may also be coupled to measurement device 110 (e.g., as shown in FIG. 2A). Suitable controllers 108, displays 112, user interfaces 114 and storage 116 will be understood by one of skill in the art from the description herein. Object 120 may be disposed on conveyor belt 122, and may move past light source(s) 102 at a predetermined speed in direction 124. As discussed above, object 120 may be transparent and/or colored. Object 120 may include a coating disposed thereon, the film thickness of which may be measured by apparatus 100.

Light source(s) 102 may be configured to generate at least one light beam of UV, visible and/or IR light. The light beam(s) from light source(s) 102 may be focused and/or directed to interact with object 120 via any suitable optical components (not shown), such as lenses, beam splitters, mirrors, etc. In some examples, the light beam may be directed from light source(s) 102 to pass through object 120, such as measurement light beam 204 shown in FIGS. 2A and 2B. The angle of incidence can vary from a perpendicular bottle surface (zero degrees) up to 80 degrees. In some examples, the light beam from light source(s) 102 may be configured to be reflected from object 120, such as reflected light beam 214 shown in FIG. 2D. This diagram illustrates zero degree incidence. However, the actual incidence angle may vary from zero to 80 degrees. Measurement light beam 204 (or measurement light beam 210 shown in FIG. 2D) may be configured to interact with object 120 at predetermined measurement location 205 (FIG. 2B, or location 215 shown in FIG. 2D) on object 120.

In some examples, light source(s) 102 may generate position detection light beam 202 in addition to measurement light beam 204 (FIG. 2A). Position detection light beam 202 may be configured to interact with object 120 at initial detection location 203 (FIG. 2B) on object 120. Detection of detection light beam 202 at initial detection location 203 may be used by controller 108 to control capture of image 208 (FIG. 2A) at predetermined measurement location 205 on object 120.

Position detector 104 may be configured to detect interaction of detection light beam 202 with object 120 at initial detection location 203 on object 120 (e.g., the edge of the container), by detecting an optical event (i.e., light from light beam 202) at detection location 203. Position detector 104 may include any suitable optical position detecting sensors such as, but not limited to photodetectors and light emitting diodes (LEDs). Position detector 104 may generate detection signal 206 (FIG. 2A) responsive to detecting that object 120 is at initial detection location 203. In some examples, position detector 104 may generate detection signal 206 when object 120 is at initial detection location 203 (or after a suitable delay to obtain container measurement at desired locations, see FIGS. 8A and 8B). In some examples, position detector 104 may generate a positive (or high) detection signal 206 when object is at initial detection location 203 and a negative (zero or low) detection signal 206 otherwise.

Detector 106 may be configured to capture image 208 having at least two wavelength channels (e.g., at least two color channels). Image 208 may be produced from interaction of measurement light beam 204 (210) with (coated) object 120 at predetermined measurement location 205 (or location 215 in FIG. 2D). The channels may include visible light and/or IR light. In an example, the channels may include three color channels, including red, green and blue color channels. Detector 106 may include, without being limited to, a camera, a charge-coupled device (CCD) detector, or a complimentary metal-oxide semiconductor (CMOS) detector. In some examples, detector 106 may include a monochrome detector having at least two different color filters disposed thereon, to obtain the at least two color channels in image 208. In some examples, detector 106 may be configured to simultaneously capture plural images corresponding to plural measurement locations (e.g., locations 205-1, 205-2 shown in FIG. 2C) on object 120 (e.g., by assigning sub-sets of pixels of detector 106 to different measurement locations). In some examples, two or more detectors 106 may be used to capture multiple images simultaneously (e.g., as shown by detectors 106-1, 106-2 in FIG. 2C).

Controller 108 may be configured to control operation of one or more of light source(s) 102, position detector 104, detector(s) 106, measurement device 110, display 112, user interface 114 and storage 116. In some examples, controller 108 may control capture of image(s) 208 from camera(s) 106 based on detection signal 206 from position detector 104. Controller 110 may also control storage (in storage 116) of values for thickness measurement (e.g., received via user interface 114) and thickness measurement results. In some examples, controller 108 may control injector 128 of coating hood 126 based on thickness measurement results determined by measurement device 110. Controller 108 may be a conventional digital signal processor, a logic circuit or a microprocessor. It will be understood by one of skill in the art from the description herein that one or more of the functions of measurement device 110 may be implemented in software and may be performed by controller 108.

Figure 2B:
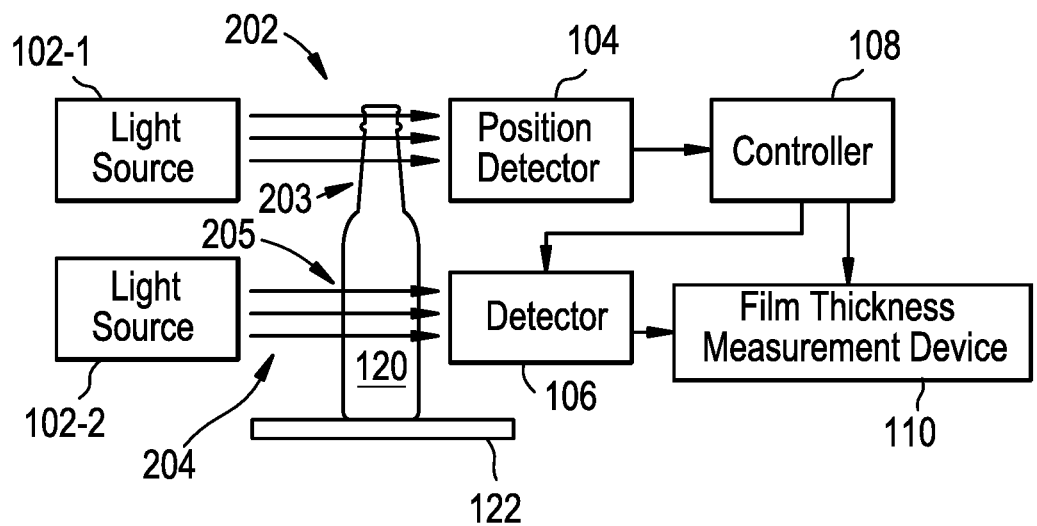
FIG. 2B is a cross-sectional view diagram of the glass bottle and the components of the apparatus shown in FIG. 2A, according to an aspect of the present invention.

Measurement device 110 may be configured to receive image(s) 208 captured by detector(s) 106 and to determine a thickness of the coating on object 120. As discussed above, each captured image 208 includes at least two channels. Image 208 may include an optical transmission image (e.g., captured as shown in FIG. 2B) or an optical reflectance image (e.g., captured as shown in FIG. 2D). For each received image, measurement device 110 may determine a relative shift (e.g., a color shift) between each of the channels. The relative shift may be determined based on a histogram of each channel.

Figure 5A:
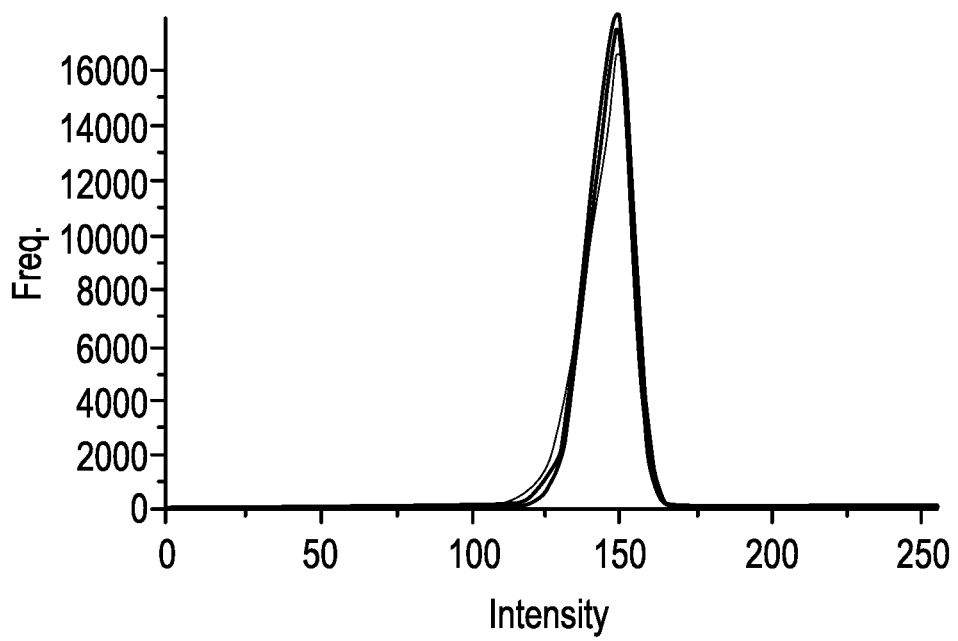
FIGS. 5A and 5B are example histograms for red, blue and green color channel images for two bottles with different coating thicknesses, respectively, according to an aspect of the present invention.
Figure 5B:
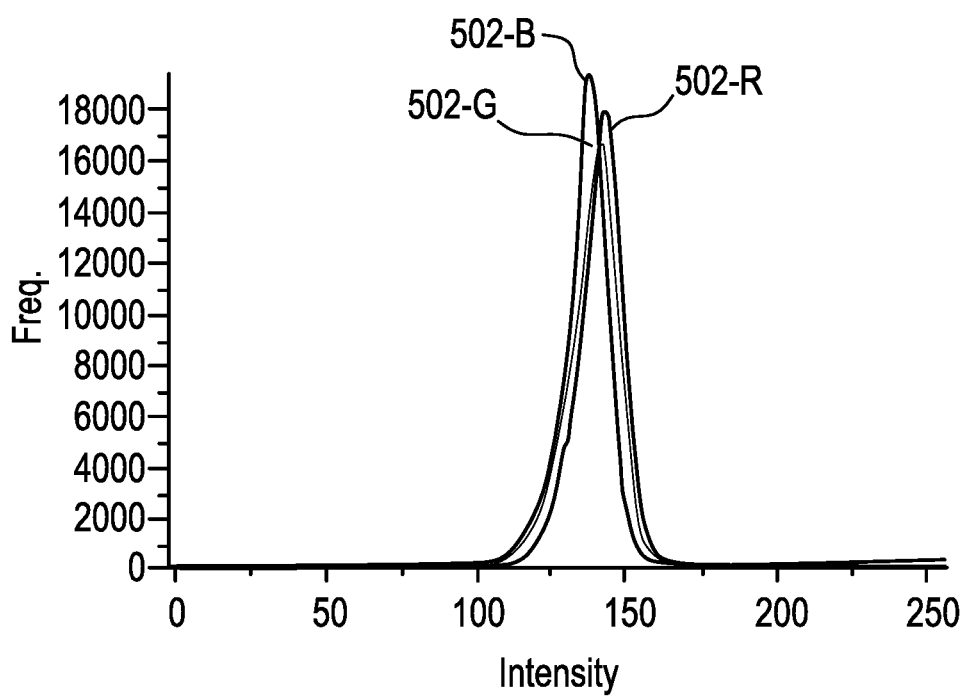

Referring to FIGS. 5A and 5B, example graphs of histograms as a function of intensity are shown for two different coating thicknesses on $SnO_2$ coated flint glass bottles. Each graph includes a histogram for red, blue and green color channels (collectively referred to as RGB histograms) of a captured optical transmission image for the respective bottle. FIG. 5A illustrates RGB histograms for a bottle with a coating thickness of approximately 3 nm. FIG. 5B illustrates RGB histograms for a bottle with a coating thickness of approximately 14 nm. The optical transmission images for each bottle were acquired with an ME600 optical microscope and a Nanosight DSU-1 CCD camera, both manufactured by Nikon Corporation (Tokyo, Japan).

As shown in FIG. 5A, when the coating is thinner (i.e., about 3 nm), the maxima of the red, green, and blue histograms are substantially overlaid (i.e., aligned) with each other. In contrast, as shown in FIG. 5B, when the coating is thicker (i.e., about 14 nm), the relative positions of the red histogram (curve 502-R), green histogram (curve 502-G) and blue histogram (curve 502-B) change.

Figure 7:
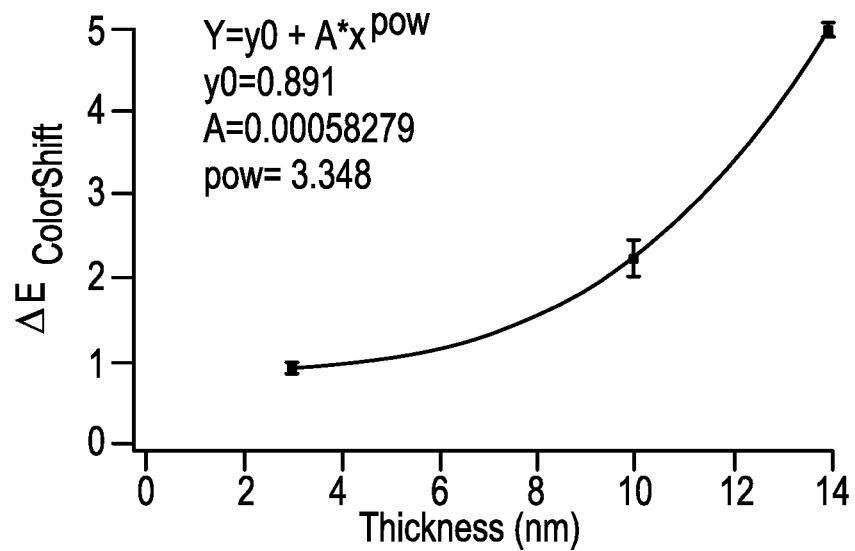
FIG. 7 is an example graph of relative color shift as a function of coating thickness, according to an aspect of the present invention.

Thus, as shown in FIGS. 5A and 5B, changes in the relative positions of the centroid (or maxima) of color channel histograms indicate film thickness. Referring back to FIG. 1, measurement device 110 may determine a relative color shift between the color channels based on the centroid (or maxima) of each color channel histogram. Measurement device 110 may then determine the coating thickness based on the relative color shift. For example, measurement device may use a predetermined relationship 312 (FIG. 3) between relative color shift and coating thickness, such as shown in FIG. 7. Measurement device 110 is described further below with respect to FIG. 3.

Display 112 may be configured to display one or more images captured by detector(s) 106, histograms, relative shift and/or thickness measurement results (by measurement device 110). The thickness measurement results may include the thickness determined by measurement device 110, an indication that the thickness is within a predetermined thickness range (e.g., within an acceptable range of thickness values) and/or an indication that the thickness is outside of the predetermined thickness range (e.g., less than or greater than the acceptable range of thickness values). It is contemplated that display 112 may include any display capable of presenting information including textual and/or graphical information. In some examples, apparatus 100 may also indicate the thickness measurement results by an audible and/or vibratory indication (e.g., when the thickness results are outside of the predetermined thickness range).

User interface 114 may be used to initiate coating thickness measurements. User interface 114 may further be used to select parameters for light source(s) 102, position detector 104, detector(s) 106, measurement device 110, display 112 and/or for values to be stored in storage 116. In some examples, user interface 114 may be used to control injector 128 of coating hood 126 (for example, based on thickness measurement results shown on display 112). User interface 114 may include any suitable interface for initiating measurements, indicating storage, analysis and/or display of quantities. User interface 114 may include, for example, a pointing device, a keyboard and/or a display device. Although user interface 114 and display 112 are illustrated as separate devices, it is understood that the functions of user interface 114 and display 112 may be combined into one device.

Storage 116 may store detection signal 206 (FIG. 2A) from position detector 104; parameters for measurement device 110 (such as optional predetermined curvature correction values 310 (FIG. 3), predetermined relationship 312 and/or predetermined defect threshold(s) 316); image(s) 208 captured by detector(s) 106; and/or histograms and/or analysis results from measurement device 110. Storage 116 may be a memory, a magnetic disk, an optical disk a hard drive, a database or essentially any local or remote non-transitory, tangible device capable of storing data.

Apparatus 100 may be configured as part of coating hood 126 having at least one injector 128. For example, light source(s) 102, position detector 104 and camera(s) 106 may be positioned within coating hood 126 downstream of injector(s) 128 (i.e., after bottle 120 is coated with the coating compound via injector(s) 128).

Coating hood 126 may be used to apply the protective film coating to hot glass containers via injector(s) 128. Coating hood 126 may isolate the glass containers from ambient conditions, and may furnish a controlled coating operation atmosphere. Coating hood 126 may include an exhaust system (not shown) which captures most of the air-entrained coating compound not adhering to the containers. The exhaust system may minimize the opportunity for the coating compound to attack building components. Coating hood 126 may include components such as blowers, blowing slots and/or suction slots to produce one or more loops of high-velocity air, such that the coating compound is distributed by injector(s) 128, is entrained within an air stream and appropriately directed to object 120 to be coated. A suitable coating hood for bottles is disclosed in Pat. App. No. PCT/US2013/037520, the content of which is incorporated by reference herein in its entirety.

It will be understood by one of skill in the art from the description herein that measurement device 110 may be located remote from camera(s) 106, such as for remote measurements. Measurement device 110 may be connected to camera(s) 106 by any suitable wired or wireless connection.

It is contemplated that apparatus 100 may be configured to connect to a global information network, e.g., the Internet, (not shown) such that the captured images, histograms and/or thickness analysis results may also be transmitted to a remote location for further processing and/or storage.

Figure 2C:
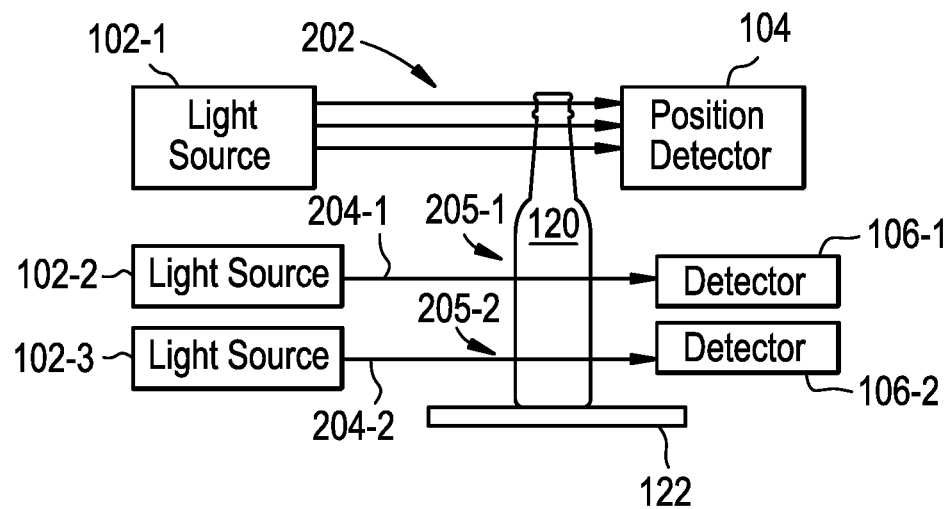
FIG. 2C is a cross-sectional view diagram of the glass bottle and some of the components of the apparatus shown in FIG. 2A, illustrating simultaneous optical transmission measurement at two measurement locations on the object, according to an aspect of the present invention.
Figure 2D:
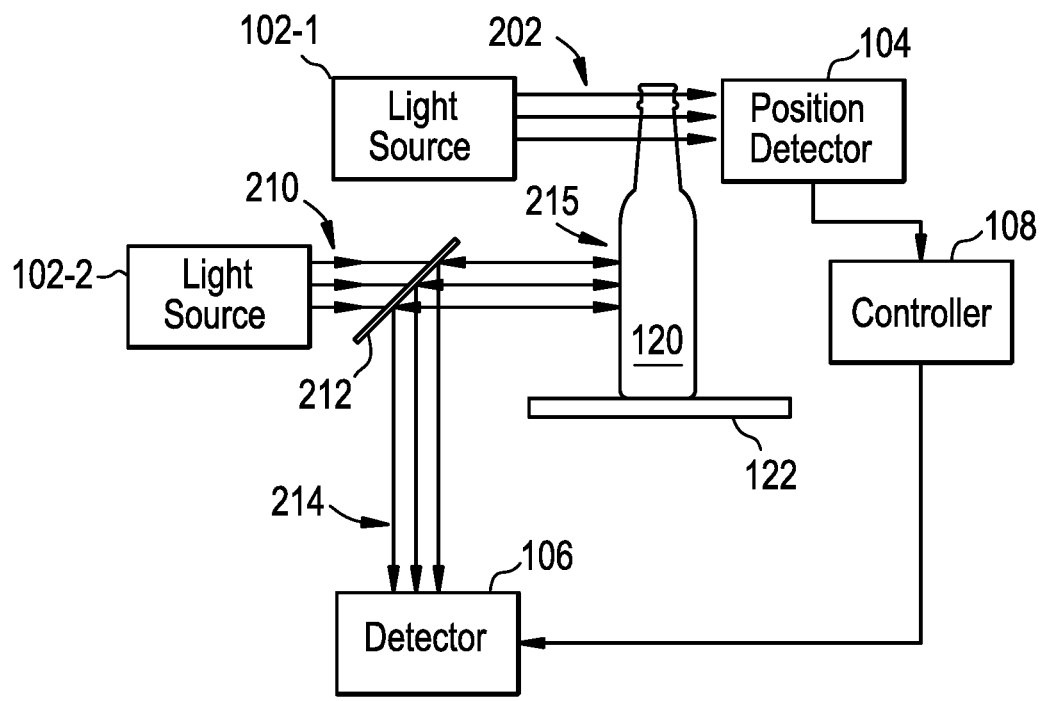
FIG. 2D is a cross-sectional view diagram of the glass bottle and some of the components of the apparatus shown in FIG. 1, illustrating optical reflectance measurement of a moving glass bottle, according to another aspect of the present invention.

Referring next to FIGS. 2A-2D, capture of one or more images via apparatus 100 is described. In particular, FIG. 2A is an overhead view diagram of (coated) object 120 and some of the components of apparatus 100 for capturing an optical transmission image; FIG. 2B is a cross-sectional view diagram of object 120 shown in FIG. 2A illustrating position detection and image capture for a single location via transmission of light through object 120; FIG. 2C is a cross-sectional diagram of object 120 shown in FIG. 2A for simultaneous capture of two optical transmission images; and FIG. 2D is a cross-sectional view diagram of (coated) object 120 and some of the components of apparatus 100 for capturing an optical reflectance image (via reflection of light from object 120). In FIGS. 2A-2D, light source(s) 102 are in fixed positions, and object 120 moves on conveyor belt 122 at a predetermined speed past light source(s) 102 in the direction indicated by arrow 124.

Referring to FIGS. 2A and 2B, one or more light sources 102 may be configured to direct position detection light beam 202 and measurement light beam 204 through object 120, such that beam 202 and beam 204 are incident on object 120 at respective initial detection location 203 and predetermined measurement location 205. Although FIG. 2B illustrates first light source 102-1 as producing beam 202 and second light source 102-2 as producing beam 204, it is understood that a single light source 102 (such as shown in FIG. 2A) may be configured to emit both beams 202 and 204 (e.g., via a suitable beam splitter and directing optics).

In operation, as object 120 moves on conveyor belt 122, object 120 passes light source(s) 102 (as well as position detector 104 and camera 106). When object 120 reaches initial detection location 203, position detector 104 detects position detection light beam 202, causing position detector 104 to generate detection signal 206. Position detector 104 sends detection signal 206 to controller 108.

Controller 108, responsive to detection signal 206, causes detector 106 to capture optical transmission image 208 at predetermined measurement location 205. Optical transmission image 208 is produced by measurement light beam 204 incident on object 120 at predetermined measurement location 205 that is transmitted through object 120 and subsequently received by detector 106.

Detector 106 may send captured optical transmission image 208 to measurement device 110, for example, responsive to controller 108. Measurement device 110, responsive to controller 108, may determine a thickness of the coating on object 120 from analysis of the captured image.

In some examples, controller 108 may use optical images (either transmission or reflectance) to determine a position of object 120 (e.g., perpendicular to both the longitudinal axis of the object and its direction of travel).

Controller 108 may cause detector 106 to sequentially capture plural images as object 120 moves past light source(s) 102 (such as at predetermined measurement locations Y0-Y5 shown in FIG. 8), once object 108 is detected at initial detection location 203. For example, given the predetermined speed of object 120 and predetermined dimensions of object 120, controller 108 may cause detector 106 to capture plural sequential images in the horizontal direction (i.e., in a direction opposite of arrow 124).

Referring to FIG. 2C, light source(s) 102 may direct multiple measurement light beams 204 (e.g., beams 204-1 and 204-2) to respective locations 205-1, 205-2 along a vertical direction of object 120, in order to capture plural simultaneous optical transmission images via detector(s) 106. Although FIG. 2C illustrates two light sources 102-2 and 102-3 generating respective measurement light beams 204-1, 204-2, it is understood that a single light source 102, with appropriate optical components, may produce measurement light beams 204-1, 204-2, as well as position detection light beam 202. Although two detectors 106-1, 106-2 are illustrated as capturing images for respective measurement locations 205-1, 205-2, it is understood that a single detector 106 may be configured to capture plural simultaneous images, via appropriate partitioning of the pixels to correspond to the respective locations 205-1, 205-2.

It is understood that, in some examples, detector(s) 106 may be configured to capture both plural simultaneous images (as shown in FIG. 2C) as well as sequential images (as described with respect to FIG. 2B).

Although FIGS. 2A-2C describe optical transmission image capture, apparatus 100 may also be configured to capture optical reflectance images, as shown in FIG. 2D. As shown in FIG. 2D, in operation, light source 102-2 (or single light source 102-1 with appropriate optical components) may generate measurement light beam 210. Measurement light beam 210 may be directed to be incident on object 120 at predetermined measurement location 215. At least a portion of measurement light beam 210 may be reflected by object 120, forming reflected light beam 214. Reflected light beam 214 is directed via beam splitter 212 to detector 106, such that detector 106 captures an optical reflectance image. Detection of position detection light beam 202 via position detector 104 and capture of optical reflectance image(s) by detector 106 responsive to controller 108 is similar to the description above with respect to FIGS. 2A and 2B. Similarly to FIGS. 2A-2C, plural optical reflectance images may also be captured by the configuration shown in FIG. 2D, sequentially, simultaneously or a combination thereof. The arrangement shown in FIG. 2D may be suitable for object 120 of colored glass (such as amber-colored glass), where one or more wavelengths of light may be absorbed according to the color, instead of transmitted through object 120.

Referring next to FIG. 3, film thickness measurement device 110 is described. Although this embodiment and the embodiments that follow are directed to determining film thickness based on capturing multiple color channels and determining relative color shift, it will be understood that wavelength channels other than color channels and relative wavelength shift can also be used. Measurement device 110 may include histogram generator 302, shift analyzer 304, thickness calculator 306 and optional defect detector 308. Measurement device 110 may receive image 208 from detector 106 and determine thickness indication 314. Measurement device 110 may be a conventional digital signal processor, logic circuit or a microprocessor. Although FIG. 3 illustrates a single image 208, it is understood that measurement device 110 may receive a plurality of images 208 from detector(s) 106, captured sequentially and/or simultaneously, as described above with respect to FIGS. 2A-2D. In FIG. 3, image 208 may be an optical transmission image (as described in FIG. 2B) or an optical reflectance image (as described in FIG. 2D).

Histogram generator 302 may be configured to receive image 208 from detector 106 (or from storage 116). Image 208 may have N color channels (CCs), where N is greater than or equal to 2. Histogram generator 302 may generate a color channel histogram for each color channel of image 208. For example, if image 208 includes red, blue and green color channels, histogram generator 302 may generate red, blue and green channel histograms.

A color channel histogram may be defined as a graphical representation of the distribution of color channel pixels (e.g., red, green, or blue pixels) as a function of their integer color value. For each color channel, pixels with adjacent values (for example, pixels with values smaller than 4, pixel values larger than 4 but smaller than 8, etc.) may be summed into bins and then mapped as a function of color value divided by the number of pixels in each bin. In the example histograms shown herein, the bin width is one pixel. In general, the bin width of the histogram may be greater than or equal to one pixel. In the examples described herein, image 208 is an RGB image having red, green and blue color channels (i.e., N=3). It is understood that the RGB image represents an example of image 208, and that image 208 may include any suitable number of color channels (with N>2) and any wavelengths of visible light and/or IR light.

When image 208 is recorded with detector 106, the light intensity and spectral distribution will typically differ from pixel to pixel. One method of measuring an average red channel value would be to sum all red pixel values and divide by the number of pixels. A similar process may be repeated for green pixels and blue pixels. This would be the CCD or CMOS camera color measurement equivalent to a spectrophotometric color measurement. In a spectrophotometric color measurement, the total light intensity is summed (and may be multiplied with a human sensitivity function) over all wavelengths. The above-described averaging process for a CCD or CMOS camera image (such as image 208) is equivalent to calculating the centroid of a histogram as long as the bin width is 1 pixel. The averaging (centroid) method treats the whole image as one large pixel. Information contained in the way the pixels are distributed may be left unused.

An important distinction in color measurement technology is that between a physical property measurement related to color, for example the intensity of light as a function of wavelength reflected off a surface, and the way a human observer perceives colors. In color technology, the term color typically relates to the human observer's perception of color.

To measure color perception, historically, color testers were asked to match the color of a test light with that of a matching light. The matching light was an overlay of three individual lights. Each of the three lights had a well-defined and very narrow wavelength distribution, as did the test light. The color testers were asked to adjust the intensities of the three matching lights until the test light color matched that of the matching light exactly. The testing led to the generation of well-known color matching functions ($\bar{r}(\lambda)$ $\bar{g}(\lambda)$ and $\bar{b}(\lambda)$) for red, blue and green light. The three light sources were selected based on the human eye. The healthy human eye has three types of receptor cells for color vision, all of which have different sensitivities to light as a function of wavelength.

There are many different normative standards for color measurements. One well known color measurement standard is the RGB system in which every color is represented by three numerical values for red (R), green (G), and blue (B). To calculate RGB values from spectrophotometric data, the intensity of transmitted or reflected light may be measured as a function of wavelength using a suitable spectrophotometer. The intensity ($I(\lambda)$) is then multiplied with each of the three color matching functions and integrated over all wavelengths of the visible spectrum to yield numerical values for R, G, and B (shown in respective equations 1-3 below). In practice the "integration" is a summation, because the intensities and color matching functions are measured at discrete intervals.

$$\int I(\lambda)\bar{r}(\lambda)d\lambda = R \qquad (1)$$

$$\int I(\lambda)\bar{g}(\lambda)d\lambda = G \qquad (2)$$

$$\int I(\lambda)\bar{b}(\lambda)d\lambda = B \qquad (3)$$

Other typical color systems such as the XYZ or Lab systems also use three components to denote a color (X, Y, and Z or L, a, and b, respectively). Any three components from one system may be transformed into another color system by means of a standardized transformation matrix. This is equivalent to a coordinate transformation from one "vector" color space into another one. Other concepts from vector calculus and geometry may also be used to measure properties of interest in color spaces (for example a change in color as a change in the length of a color "vector") or to demonstrate unobvious properties and relationships within and among them.

CMOS or CCD cameras (such as detector 106) use arrays of semiconductors, electronic circuitry, and other device components, as well as software algorithms, to generate numerical values for R, G, and B at every pixel of an image they capture. The R, G, and B values are represented as integer numbers, ranging from 0 to a multiple of 2 ($2^L$, with L being an integer.) These values are written into a matrix for each color channel (R, G, and B) in a so called true color image. The number of columns and rows in the R, G, and B matrices correspond to the number of pixels of detector 106 unless further image processing or pixel binning (i.e., combining several pixels to one larger pixel) is performed.

In CMOS/CCD cameras, the usable range of values depends on how many electrical charges the semiconductor elements generate when they are exposed to light, the noise level, and the analog to digital conversion. Typically images are digitized such that the range of values for each color channel (R, G, and B) is $256=2^8$, or 8 bit, so that there are 256 shades or red, green, and blue. The number of charges generated is an indirect measure of the light intensity. A combination of color filters and software algorithms may be used to determine how many charges are created by wavelength bands in the red, green, and blue regions at every pixel. Fewer charges correspond to a lower light intensity. A lower light intensity for red light may result in a lower numerical value for the R value. The same is true for the G, and B values.

Measurement device 110, uses light intensity values captured by detector 106, as opposed to color perception, to determine the film thickness of a coating compound on object 120. Thus, histogram generator 302 uses the light intensity values for each color channel in image 208 to generate a color channel histogram for each color channel. Each color channel histogram may, for example, be provided to color shift analyzer 304, optional defect detector 308, display 112 (FIG. 1) and/or storage 116.

Color shift analyzer 304 may be configured to receive a color channel histogram for each color channel, as determined by histogram generator 302. For each color channel histogram, color shift analyzer may determine a centroid of the respective histogram. The centroid of each color channel histogram may be used, by color shift analyzer 304, to determine a relative color shift between each of the color channels received in image 208. The determination of relative color shift is described further below.

In conventional color measurement techniques, color changes are measured through integration of spectrophotometric light intensity data over a range of wavelengths or, when CCD/CMOS cameras are used, by summing color responses from each pixel of a camera and determining an average color response value. For RGB color measurements, this is related to determining the centroid of the color histograms for the R, G, and B color channels and normalizing the result. A conventional color difference ΔE between two images with RGB values of $R_1$, $G_1$, $B_1$ and $R_2$, $G_2$, $B_2$ and $\Delta R=R_2-R_1$, $\Delta G=G_2-G_1$, and $\Delta B=B_2-B_1$ is calculated, according to equation (4), as:

$$\Delta E = \sqrt{\Delta R^2 + \Delta G^2 + \Delta B^2} \quad (4)$$

where ΔE may be interpreted as the change in length of a color vector.

In contrast, color shift analyzer 304 determines the centroid positions (e.g., $C_r$, $C_g$, and $C_b$) of respective red, green and blue channel histograms for image 208 (determined by histogram generator 302). The centroid position represents the arithmetic mean position of all the points in the histogram. The mean may be different from a maximum value position of the histogram.

Color shift analyzer 304 then determines a relative position shift between the centroid positions of all the color channels (i.e., $C_r-C_g$, $C_r-C_b$, and $C_g-C_b$). The relative color shift ($\Delta E_{ColorShift}$) between each of the color channels may be determined by squaring all of the relative position shifts and summing the result. Finally, the square root of the sums is determined, forming a square root of a sum of squared differences between each centroid position. The relative color shift $\Delta E_{ColorShift}$ determined by color shift analyzer 304 is shown in equation (5) as:

$$\Delta E_{ColorShifts} = \sqrt{(C_r-C_g)^2 + (C_r-C_b)^2 + (C_g-C_b)^2} \quad (5)$$

In some examples, the relative color shift may be determined as a percentage, by multiplying $\Delta E_{ColorShift}$ (equation 5) by 100. Color shift analyzer 304 may, for example, provide the relative color shift $\Delta E_{ColorShift}$ to thickness calculator 306, display 112 (FIG. 1) and/or to storage 116.

Figure 6A:
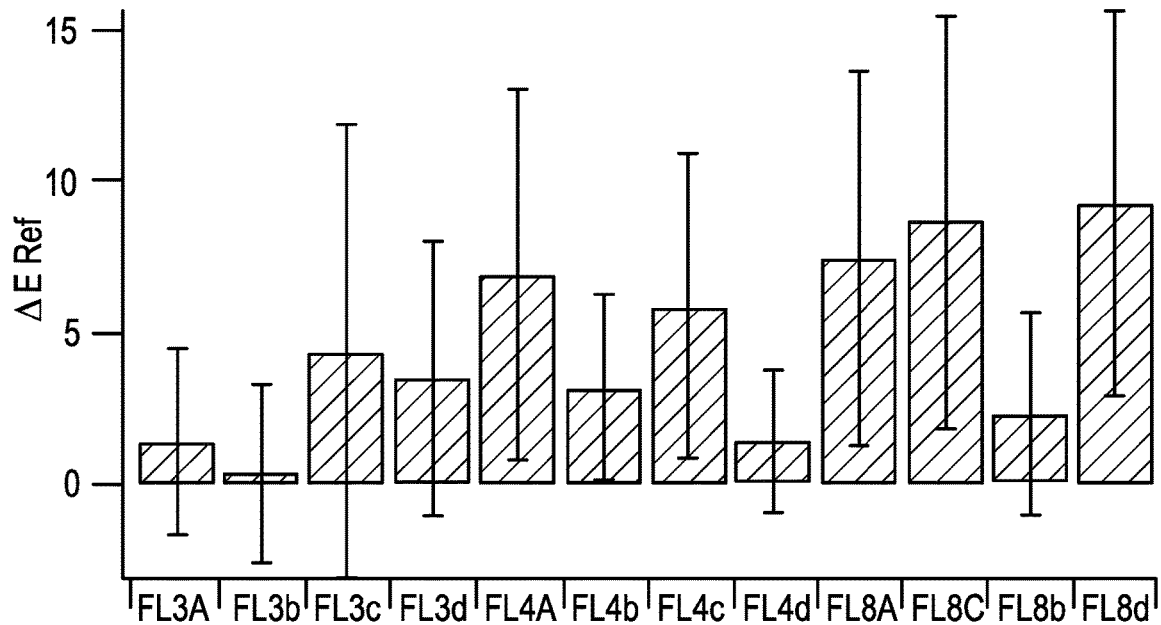
FIGS. 6A and 6B are example bar graphs of conventional color difference and relative color shift according to the present invention, respectively, calculated for sets of flint bottles with different coating thicknesses.
Figure 6B:
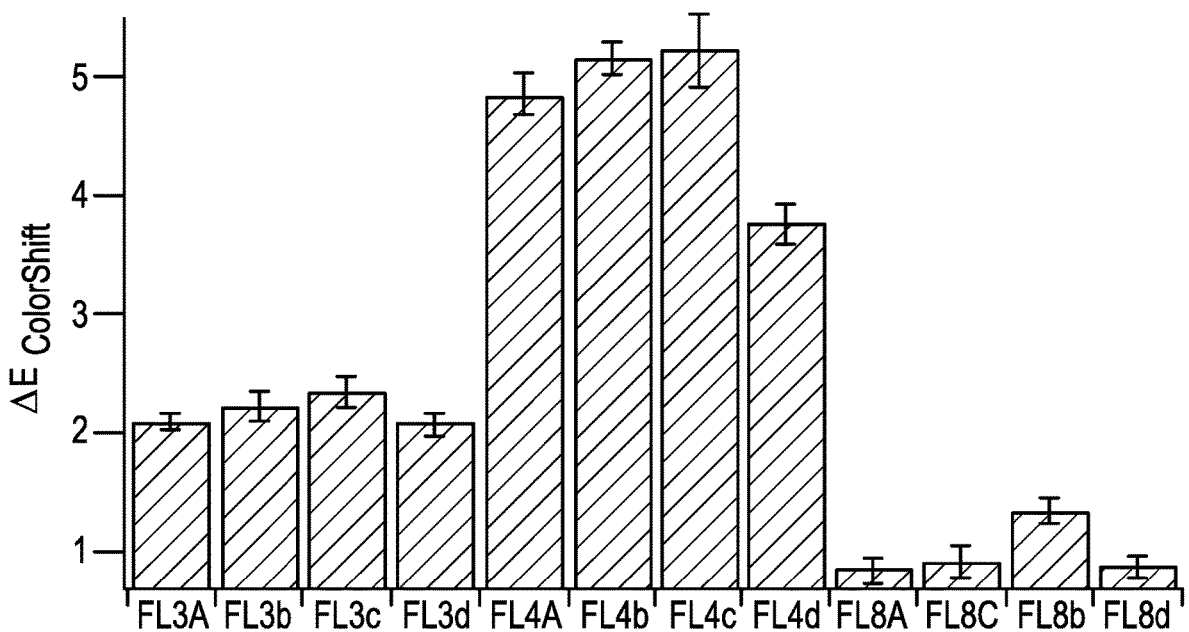
Figure 6C:
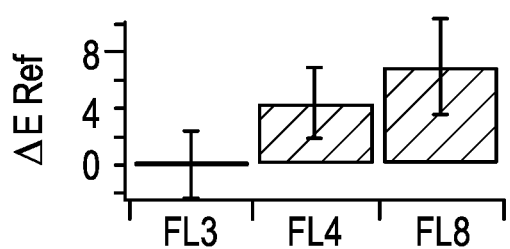
FIGS. 6C and 6D are example bar graphs of average color difference and average relative color shift for different coating thicknesses based on the results shown in respective FIGS. 6A and 6B.
Figure 6D:
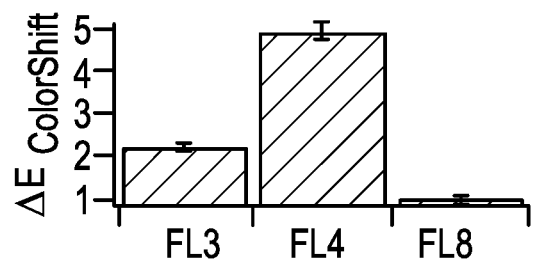
Figure 6E:
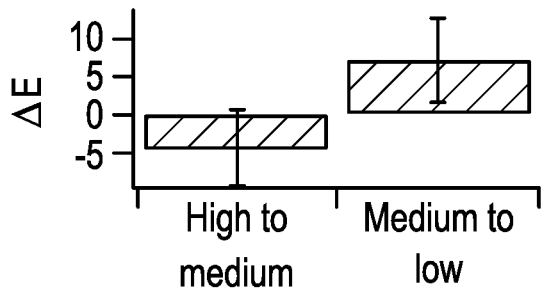
FIGS. 6E and 6F are example bar graphs of variation in color difference and variation in relative color shift, respectively, when the coating thickness is increased or decreased, based on the results shown in respective FIGS. 6A and 6B.
Figure 6F:
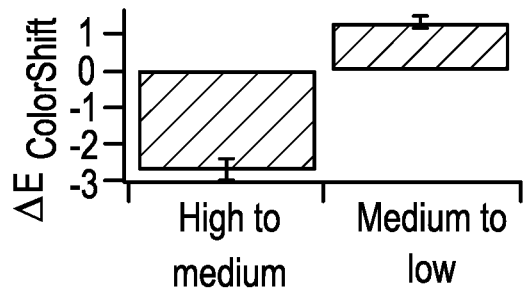
Figure 6G:
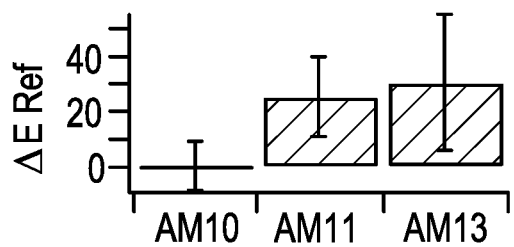
FIGS. 6G and 6H are example bar graphs of conventional average color difference and average relative color shift according to the present invention, respectively, calculated for sets of amber bottles with different coating thicknesses.
Figure 6H:
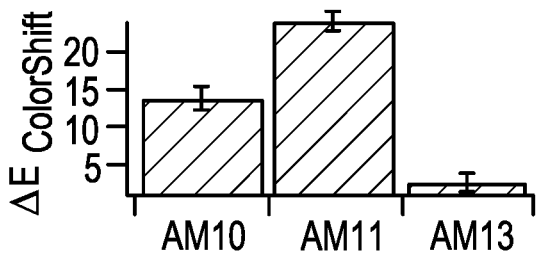
Figure 6I:
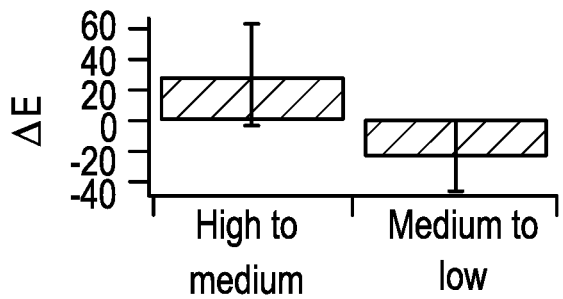
FIGS. 6I and 6J are example bar graphs of variation in color difference and variation in relative color shift, respectively, when the coating thickness is increased or decreased, for sets of amber bottles with different coating thicknesses.
Figure 6J:
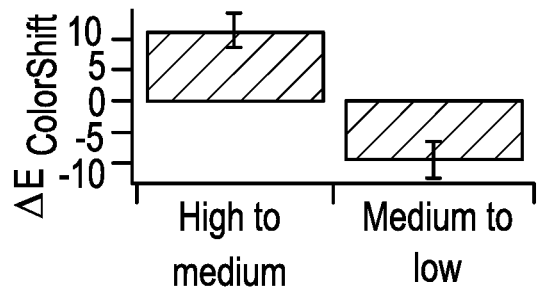

Referring next to FIGS. 6A-6J, example comparisons of conventional color difference ΔE (equation 4) and relative color shift $\Delta E_{ColorShift}$ (equation 5) are shown. The comparisons are determined from RGB images of flint glass and amber glass bottles with different coating thicknesses. In particular, FIGS. 6A and 6B are example bar graphs of color difference and relative color shift, respectively, calculated for sets of flint bottles with different coating thicknesses; FIGS. 6C and 6D are example bar graphs of average color difference and average relative color shift for different coating thicknesses based on the results shown in respective FIGS. 6A and 6B; FIGS. 6E and 6F are example bar graphs of variation in color difference and variation in relative color shift, respectively, when the coating thickness is increased or decreased, based on the results shown in respective FIGS. 6A and 6B; FIGS. 6G and 6H are example bar graphs of average color difference and average relative color shift, respectively, calculated for sets of amber bottles with different coating thicknesses; and FIGS. 6I and 6J are example bar graphs of variation in color difference and variation in relative color shift, respectively, when the coating thickness is increased or decreased, for sets of amber bottles with different coating thicknesses. In general, FIGS. 6A-6J illustrate that relative color shift (equation 5) (using a relative centroid position shift) is more sensitive to film thickness and improved repeatability compared with color difference (equation 4) (using an absolute centroid position).

FIGS. 6A, 6C, and 6E illustrate results for ΔE color measurements (equation 4) with sets of flint (F) glass bottles. FIGS. 6B, 6D, and 6F illustrate results for $\Delta E_{ColorShift}$ color measurements (equation 5) with the same sets of flint (F) glass bottles. All bottles had been coated with $SnO_2$. Each set consisted of four bottles with approximately the same film thicknesses. Film thicknesses of bottle set FL4 (4a, 4b, 4c, and 4d) were approximately 14 nm, film thicknesses of bottle set FL3 (3a, 3b, 3c, and 3d) were approximately 10 nm, and film thicknesses of bottle set FL8 (8a, 8b, 8c, and 8d) were approximately 3 nm. The results shown in FIGS. 6A-6F are based on optical transmission images obtained with a Nikon ME600 optical microscope and a Nikon Nanosight DSU-1 CCD camera, using the arrangement shown in FIG. 2A. Ten images and ten measurements were taken for each bottle. Bottle set FL3 (FL3A-FL3d) represents an intermediate thickness (i.e., about 10 nm). Bottle set FL8 (FL8A-FL8d) represents a low thickness (i.e., about 3 nm). Bottle set FL4 (FL4A-FL4d) represents a high thickness (i.e., about 14 nm).

The coating thickness values were measured independently with a device from American Glass Research (AGR). The average RGB values for the four samples in intermediate thickness set FL3 (with a coating thickness of about 10 nm) were used as a reference in a sense that, to calculate color differences ΔE, the RGB values of each captured image were subtracted from those of the reference as in equation 4 above. The error bars in FIGS. 6A-6J are 95% confidence intervals, assuming a normal distribution.

A typical thickness of a commercial hot-end coating is about 10 nm. FIG. 6A illustrates that color measurement analysis based on equation 4 (color difference) cannot discern coating thickness differences of 3 to 14 nm within a confidence of 95%. In contrast, in FIG. 6B, color measurement analysis based on relative color shift (equation 5) significantly improves the ability to discern coating thicknesses for hot end coatings within a range of coating thicknesses that may be of commercial interest.

FIGS. 6C and 6D illustrate the average of the color difference $\Delta E$ (FIG. 6C) and the average of the relative color shift $\Delta E_{ColorShift}$ (FIG. 6D) for each set of four bottles, i.e., set $FL_{ColorShift}$ (10 nm), set FL4 (14 nm) and set FL8 (3 nm). The results shown in FIGS. 6C and 6D were obtained by averaging the results from the four bottles for each thickness, and 10 measurements for each bottle, so that each bin represents 40 measurements.

FIGS. 6E and 6F illustrate respective changes in $\Delta E$ (equation 4) and $\Delta E_{ColorShift}$ (equation 5) when the coating thickness is increased from 10 nm to 14 nm (high to medium) or decreased from 10 nm to 3 nm (medium to low). The 10 nm average was set to zero to monitor relative thickness changes. The results shown in FIGS. 6E and 6F were obtained by averaging the results from the four bottles for each thickness, and 10 measurements for each bottle.

In FIGS. 6E and 6F, the same results as shown in respective FIGS. 6C and 6D are plotted relative to the 10 nm result (used as a calibration standard). As shown in FIG. 6F, lowering the coating thickness from 10 nm to 3 nm (medium to low thickness variation) causes the relative color shift to decrease. Increasing the coating thickness from 10 nm to 14 nm (high to medium) results in an increase in the relative color shift. Presenting the relative color shift results as in FIG. 6F may be useful for quality control procedures in which deviations from a target thickness (e.g., 10 nm) are monitored.

FIGS. 6G and 6I illustrate results for $\Delta E$ color measurements (equation 4) with sets of amber (AM) glass bottles. FIGS. 6H and 6J illustrate results for $\Delta E_{ColorShift}$ color measurements (equation 5) with the same sets of amber (AM) glass bottles. The results shown in FIGS. 6G-6J are based on optical reflectance images obtained with the same optical microscope camera described above regarding FIGS. 6A-6F, using the reflectance measurement arrangement shown in FIG. 2D.

FIGS. 6G and 6H illustrate the average of the color difference $\Delta E$ (FIG. 6G) and the average of the relative color shift $\Delta E_{ColorShift}$ (FIG. 6H) for each set of bottles, i.e., set AM10 (10 nm), set AM11 (14 nm) and set AM13 (3 nm). The results shown in FIGS. 6G and 6H are based on measurements with four bottles for the 14 nm and 10 nm thicknesses (i.e., sets AM10 and AM11), and on one bottle for the 3 nm thickness (i.e., set AM13). Ten measurements for each bottle were performed.

FIGS. 6I and 6J illustrate respective changes in $\Delta E$ (equation 4) and $\Delta E_{ColorShift}$ (equation 5) when the coating thickness is increased from 10 nm to 14 nm (high to medium) or decreased from 10 nm to 3 nm (medium to low). The 10 nm average was set to zero to monitor relative thickness changes. The results shown in FIGS. 6I and 6J are based on measurements with four bottles for the 14 nm and 10 nm thicknesses, and on one bottle for the 3 nm thickness. Ten measurements for each bottle were performed. FIGS. 6G-6J illustrate that relative color shift measurements can better discern coating thickness differences for amber glass bottles (compared to color difference measurements).

Referring back to FIG. 3, thickness calculator 306 may be configured to receive the relative color shift $\Delta E_{ColorShift}$ for image 208 from color shift analyzer 304 and determine thickness indication 314 for image 208. Thickness calculator 306 may use predetermined relationship 312 (for example, stored in storage 116 (FIG. 1)) between relative color shift and coating thickness to determine thickness indication 314. Thickness indication 314 may, for example, be stored in storage 116 and/or provided to display 112.

FIG. 7 is an example predetermined relationship 312 (also referred to herein as a calibration curve) between relative color shift and coating thickness that may be used to determine thickness indication 314. FIG. 7 represents an example calibration curve that relates $\Delta E_{ColorShift}$ (equation 5) measurements to film thickness for a total of 12 flint glass bottles. The results shown in FIG. 7 are based on averages of four bottles for each thickness and 10 measurements for each bottle. The thickness measurements were performed independently with a commercially available instrument from AGR Research. The calibration curve is obtained by plotting $\Delta E_{ColorShift}$ as a function of coating thickness and fitting the results with a suitable polynomial. In FIG. 7, the coating thickness was measured in CTU units. Ten CTU correspond to approximately 3 nm and the scale is linear. Although not shown, a similar calibration curve may be obtained for amber bottles.

Referring back to FIG. 3, thickness indication 314 may include the actual thickness determined from predetermined relationship 312, an indication that the thickness is within a predetermined thickness range (e.g., stored in storage 116) and/or an indication that the thickness is outside of the predetermined thickness range.

In some examples, color shift analyzer 304 may apply optional curvature correction value 310 (e.g., stored in storage 116 (FIG. 1)) to the relative color shift $\Delta E_{ColorShift}$, based on measurement location 205 (FIG. 2B, or measurement location 215 shown in FIG. 2D) on object 120. In some examples, optional curvature correction value 310 may be based on a calibration standard associated with measurement location 205, assuming that the signal strength as a function of curvature is not a function of coating thickness. A curvature correction value may be applied to the relative color shift or after the thickness is determined, e.g., from a calibration curve.

In some examples, a light spot shape, spot size, measurement location 205 (215) and radius of curvature of object 120 may be used to adjust the relative color shift $\Delta E_{ColorShift}$ prior to determining thickness indication 314.

Figure 8A:
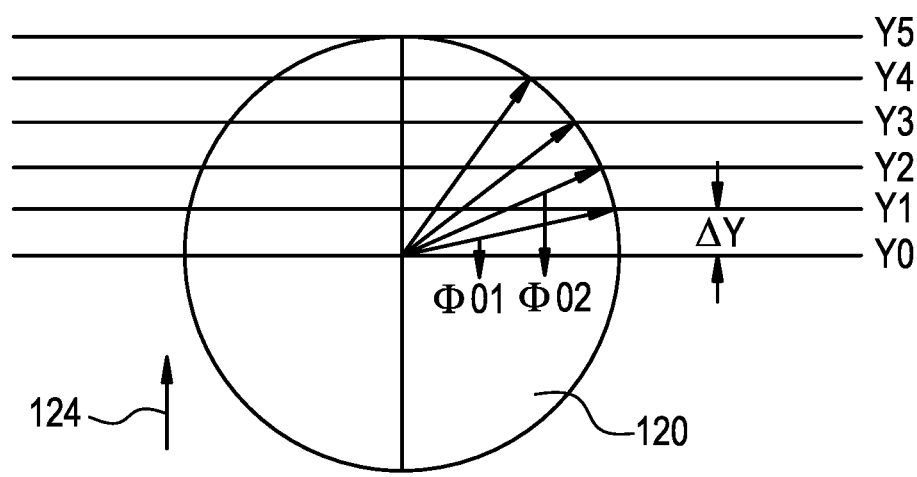
FIG. 8A is an overhead view diagram of a bottle illustrating an example relationship between measurement locations for plural sequential measurements and curvature correction, according to an aspect of the present invention.

Referring to FIG. 8A, a cross section of object 120 is shown that moves past (fixed) light source 102 (not shown in FIG. 8A) at a predetermined speed along direction 124. It is assumed that light source 102 is opposite detector 106 (such as shown in FIG. 2B) such that light source 102 produces, through any suitable lenses and apertures, a square shaped light spot with spot lengths $\Delta Y$, such that the spot area is $\Delta Y^2$. The shape of the object 120 in FIG. 8A is cylindrical (at least at the spots at which thickness measurements are performed). A similar procedure may be performed for other objects and light spot shapes. The bottle is moving along conveyor belt 122 (not shown in FIG. 8A) whereas the measurement system is stationary. In an example, position detector 104 (FIG. 2B) may trigger a first measurement when the light spot interacting with object 120 is centered between locations Y5 and Y4 (i.e., at position Y4+(Y5−Y4)/2=(Y5+Y4)/2). Another measurement may be triggered when the spot center moves down so that it is located at position (Y4+Y3)/2 and so forth. In the example of FIG. 8A, a total of 10 measurements may be completed as object 120 passes light source 102 and detector 106 (FIG. 2B).

It is assumed that the light signal delta E color shift scales with the coating volume. For a flat square with diameter $\Delta Y$ and a coating thickness of d the coating volume would be $\Delta Y^2 d$. However, because of the radius of curvature the effective volume is larger. For example, the effective volume is $R(\phi_{05}-\phi_{04})d$ if R is the radius of the bottle and $\phi_{05}$ and $\phi_{04}$ are 90° and the angle from where line Y0 crosses the circle to where line Y4 crosses it. The radius of object 120 would be known in a typical production facility. From the geometry of object 120, the trigger signal (from position detector 104) and the known speed of conveyor belt 122, the positions Y0 to Y5 (as well as the other 5 positions below line Y0) are known. The relationship between coating thickness and signal strength may be established through a calibration curve using objects with known coating thicknesses measured at position Y0 (minimal curvature) or flat samples, if available. The angles $\phi_{0i}$ can be determined from the known bottle radius R and the known spot center positions as follows (Y01=spot centered between Y0 and Y1 etc.) such as $$Y01 = R\sin\left(\frac{\phi_{01}}{2}\right) \Rightarrow \phi_{01} = 2\arcsin\left(\frac{Y01}{R}\right)$$

$$Y12 = R\sin\left(\frac{\phi_{12}+\phi_{01}}{2}\right) \Rightarrow \phi_{12} = 2\arcsin\left(\frac{Y12}{R}\right) - \phi_{01},$$

etc.

In one embodiment, each thickness or delta E color shift value is multiplied by the ratio of effective volume (taking curvature into account) and the volume for the center spot. Alternatively, the angular distance may be calibrated from measurements with a bottle of known thickness, especially for reflectance measurements for which there is a complicated angular dependence of the signal.

Figure 8B:
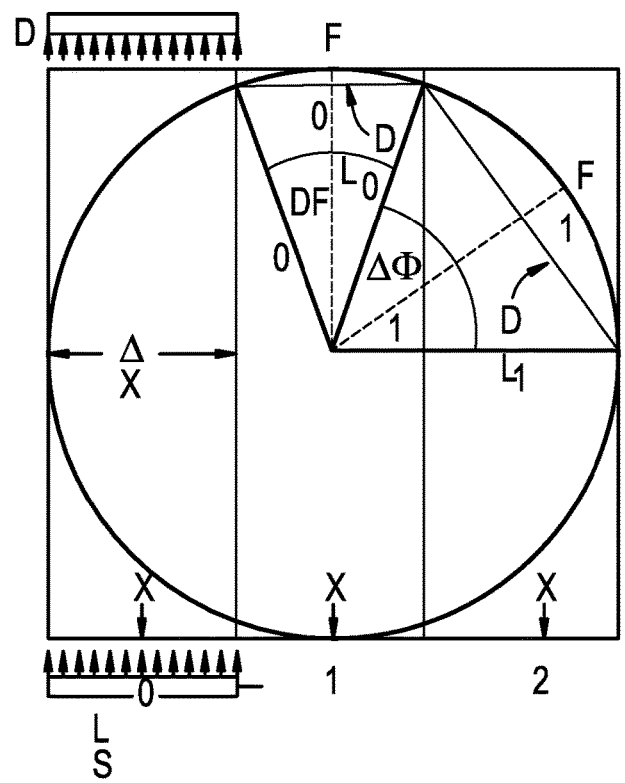
FIG. 8B is a cross-section of a bottle illustrating another example relationship between measurement locations for plural sequential measurements and curvature correction, according to an aspect of the present invention.

FIG. 8B represents a cross-section of a glass bottle. The circle represents the circumference of the bottle. A transmission geometry is depicted in which a single light source (LS) and a single detector (D) are positioned parallel to each other. The bottle is positioned in between the detector and light source. Alternatively, multiple light sources and/or detectors positioned at angles other than zero degrees relative to each other could be used. Additionally, the bottle does not have to be placed in between the light source and the detector. For example, in reflection geometry the bottle would not be placed in between the light source and detector. Three measurements are taken in the sketched example. A single measurement or any number of measurements larger than one could be practiced as an alternative. The number of measurements is only being limited by the processing speed of the detector and computer unit (not shown) to process data relative to the speed of movement of the bottle.

In FIG. 8B, the bottle is illustrated as moving from left to right. Measurements are taken when the center of the light source is at positions X0, X1, and X2.

Bottle position detection relative to the line connecting the points Xi (i=0, 1, 2) may be realized through a second detection system consisting of a light source and a detector positioned above the first set of light source and detector in a way such that the light path between the second light source and second detector is blocked whenever a neck of a bottle (not shown) passes by. The time of "blocking" could be used to trigger measurements at fixed time intervals. This procedure assumes that the bottle geometry is known, that the bottle has a neck with a diameter different from its center, and that the bottles move at constant speed. This is indeed the case in a typical bottle production facility.

Alternatively, the position detection could be realized through analysis of the intensity distribution of the image which is captured by the detector (camera). This technique of position detection is based on the fact that the transmission of light and therefore the color signal measured by different pixels of the camera is a function of bottle position. When the bottle moves from left to right a change in transmission will be detected at pixels closer to the right edge of the detector first and the transmission will be different for the center of the bottle compared to the edges due to bottle curvature (see sketch.)

In reflection geometry the position of the bottle along the line connecting points Xi (see FIG. 8B) could also be detected through image analysis as a function of time. In addition, in reflection geometry the position of the bottle relative to a line perpendicular to the line connecting points Xi could also be determined from image analysis. This is based on the fact that the so called distinction of image, measurable as the degree of blurriness, as well as total intensity (and color signal strength) measured by the detector are a function of distance from light source and detector. This is of practical relevance, since the widths of typical conveyor belts in bottle production facilities is typically larger than the bottle diameters and bottles may move slightly in a direction perpendicular to it which is, in FIG. 8B, perpendicular to the line connecting points Xi.

The signal strength of the color signal scales with the total volume of coating which is illuminated by the probing light and which reaches the detector. The total bottle area illuminated by a circular light beam of diameter $\Delta X$ centered at position X1 will have an elliptical shape due to the bottle curvature. The area A of this ellipse will be:

$$A = \pi \cdot \frac{\Delta X}{2} \cdot \left(\frac{R \cdot \Delta \Phi_0}{2}\right)$$

If the coating thickness is d, the total coating volume probed when the center of the light source at position X1 is $A \cdot d$. To calculate the corresponding volumes for positions X0 and X2, we can use the same equation for A as above with $\Delta \Phi_0$ replaced by $\Delta \Phi_1$.

The angle $\Delta \Phi_0$ can be calculated from $\Delta X$ and R using the following equation:

$$\frac{\Delta \Phi_0}{2} = \arcsin\left(\frac{\frac{\Delta X}{2}}{R}\right) = \arcsin\left(\frac{\frac{\Delta L_0}{2}}{R}\right), \text{ and } \frac{\Delta \Phi_1}{2} = \Phi_1 - \frac{\Delta \Phi_0}{2}$$

If more than three measurements are taken, consecutive angles $\Delta \Phi_i$ can be calculated using:

$$\frac{\Delta \Phi_i}{2} = \Phi_i - \Phi_{(i-1)} - \frac{\Delta \Phi_{(i-1)}}{2}$$

For angles $\Phi_i$ we get:

$$\Phi_0 = 0$$

$$\Phi_1 = \frac{\Delta \Phi_0}{2} + \frac{\Delta \Phi_1}{2}$$

$$\Phi_i = \Phi_{(i-1)} + \frac{\Delta \Phi_{(i-1)}}{2} + \frac{\Delta \Phi_i}{2} \text{ for } i > 1.$$

Together with the known distance between measurements $\Delta X$, the equations above could be used to correct for changes in measured coating thickness due to curvature.

Referring back to FIG. 3, optional defect detector 308 may be configured to receive color channel histograms from histogram generator 302 and determine whether a characteristic of one or more of the color channel histograms indicates a defect. The defect may include a dirt indication, a scratch indication and/or a weld-line indication. The characteristic of the histogram may include a change in the distribution. In the examples below, a widening of the histogram distribution may indicate a defect. It is understood that histogram widening represents an example characteristic and that other characteristics, such as amplitude may be used in addition to or instead of distribution width.

Optional defect detector 308 may compare the histogram characteristic (of one or more color channels) to predetermined defect threshold 316 (such as a predetermined distribution width) which may indicate the presence of a defect. Defect threshold 316 may be stored in storage 116 (FIG. 1). When defect detector 308 determines that the histogram characteristic is greater than defect threshold 316, defect detector 308 may generate defect indication 318 that the measurement be discarded for the current measurement location. Defect detector 308 may provide defect indication 318, for example, to controller 108 (FIG. 1), display 112, storage 116, color shift analyzer 304, and/or thickness calculator 308. In some examples, defect indication 318 may cause the color channel histograms to be excluded from analysis by color shift analyzer 304 and thickness calculator 306 for the current measurement location. In some examples, a number of defect indications 318 triggered during thickness measurement may be used to terminate the thickness measurement process.

In one example, multiple measurements may be used to compensate for defects such as dirt and/or scratches. In other examples, a characteristic of the color channel histogram may be used to compensate for defects. In particular, larger scratches, dirt and weld-lines may cause a significant widening of the color histogram distributions (described further below with respect to FIGS. 9-12B). The histogram distribution width (of one or more color channel histograms) may be used to compensate for defects (e.g., dirt, scratches and weld-line artifacts). For example, the distribution width may be used to exclude histograms from the analysis when the widening of the distribution exceeds defect threshold 316. The widening may be quantified from a Gaussian curve fitted to one or more of the color channel histograms.

Figure 9:
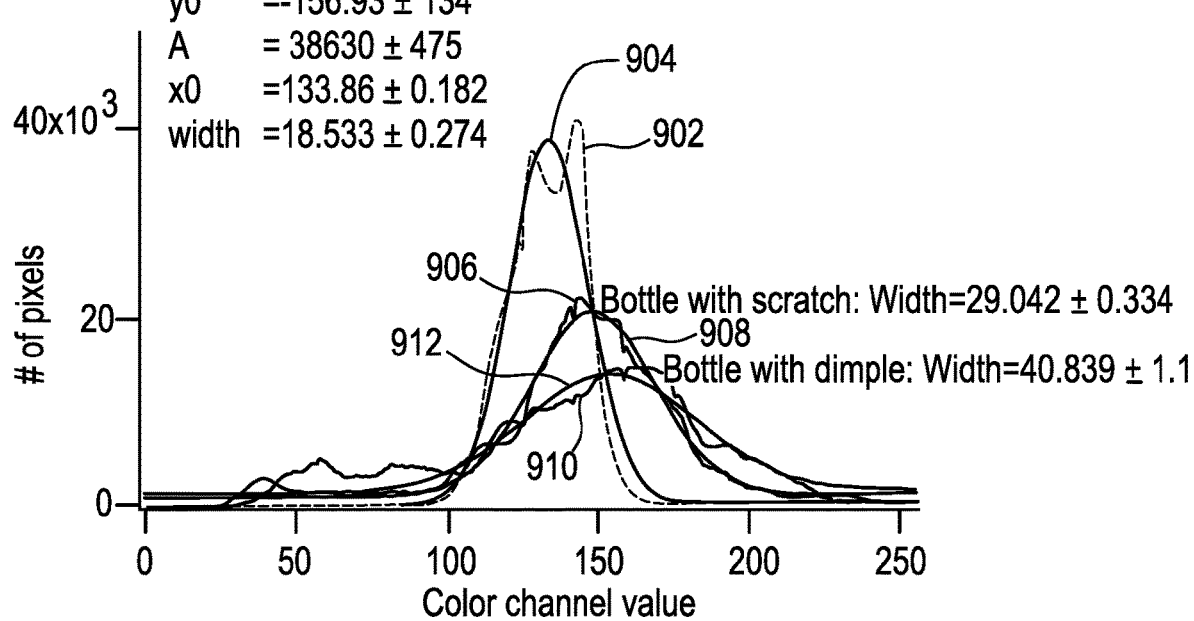
FIG. 9 is a graph illustrating example histograms and respective Gaussian-fitted curves as a function of color channel value for a green color channel images of beer bottles with and without defects, illustrating the effects of the various defects on the histograms, according to an aspect of the present invention.

FIG. 9 is a graph illustrating example histograms (902, 906 and 910) and respective Gaussian-fitted curves (904, 908 and 912) as a function of green color channel value from an image of a beer bottle, illustrating the effects of various defects on histograms 902, 906 and 910. Curve 902 represents a green color channel histogram for a bottle with no defects. Curve 906 represents a green color channel histogram for a bottle with a scratch. Curve 910 represents a green color channel histogram for a transparent bottle with a dimple (i.e., dirt particles). Gaussian-fitted curves 904, 908 and 912 show that the distribution width increases when the object includes defects (e.g., scratches or dirt particles).

Figure 10A:
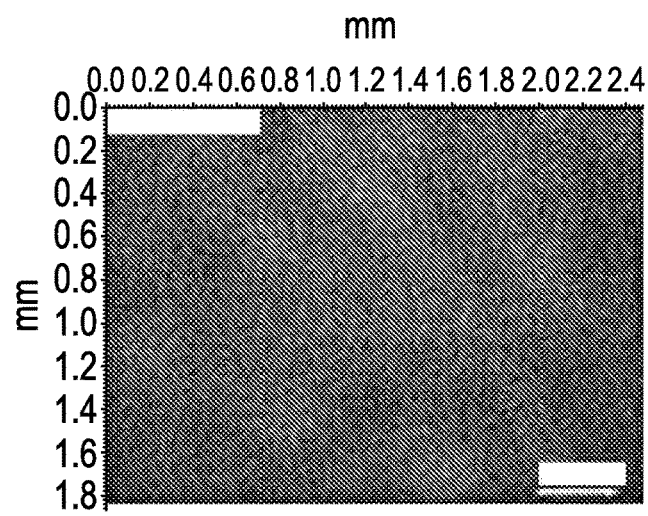
FIGS. 10A, 10B and 10C are example captured red, blue green (RGB) channel images of a portion of a bottle having no defect, having a scratch and having dirt particles, respectively, according to an aspect of the present invention.
Figure 10B:
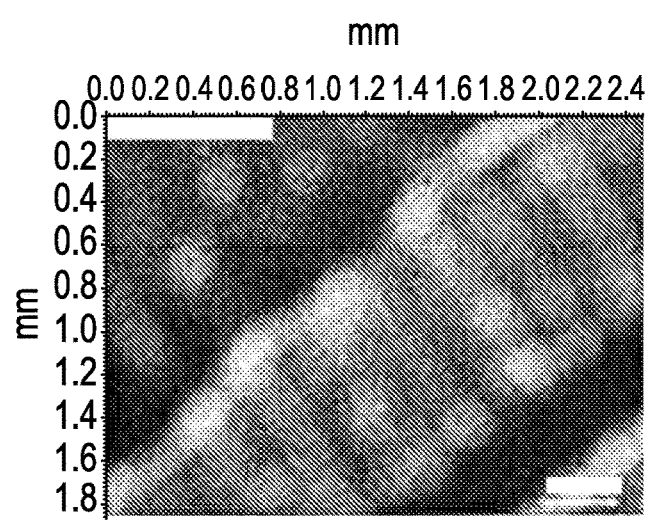
Figure 10C:
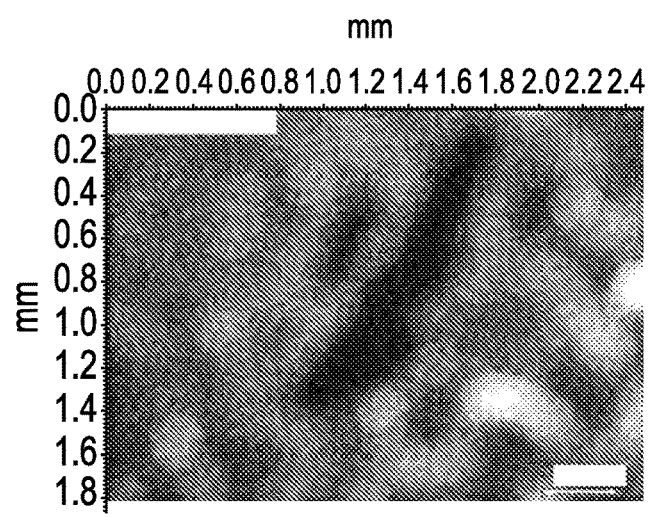
Figure 10D:
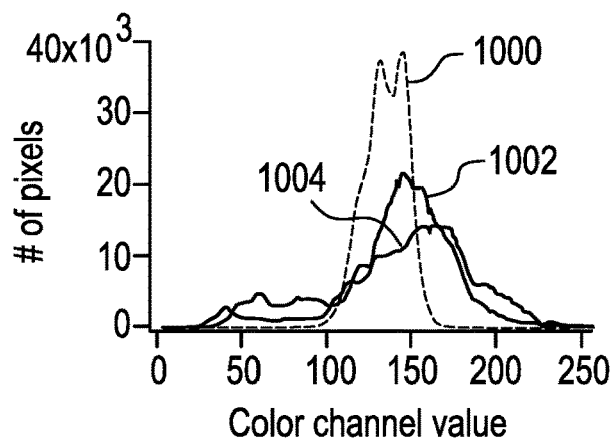
FIGS. 10D, 10E and 10F are example histograms of the respective green, red and blue color channels of the captured images shown in FIGS. 10A, 10B and 10C, illustrating changes in each color channel histogram due to the presence of defects, according to an aspect of the present invention.
Figure 10E:
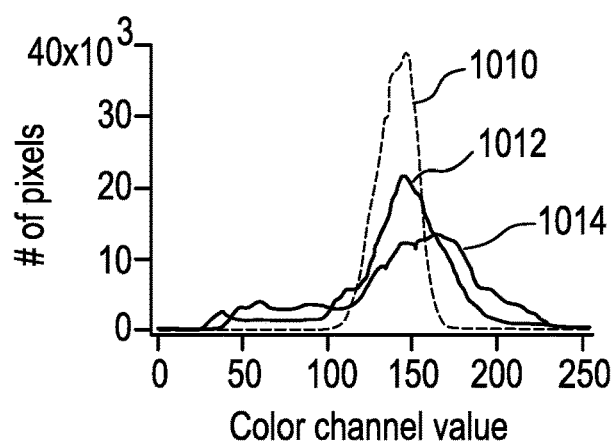
Figure 10F:
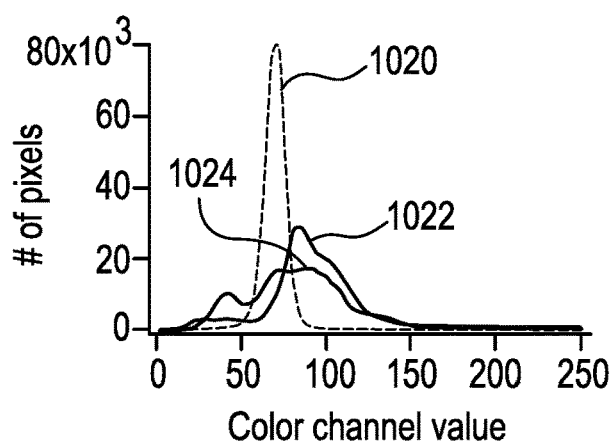

FIGS. 10A-10C are example captured RGB transmission images of a portion of a bottle having no defect (FIG. 1), having a scratch (FIG. 10B) and having dirt particles (FIG. 10C). The optical transmission images may be captured using an arrangement similar to that the arrangement shown in FIG. 2B. FIGS. 10D-10F are example histograms of the respective green channel (FIG. 10D), red channel (FIG. 10E) and blue channel (FIG. 10F) of the captured images shown in FIGS. 10A, 10B and 10C, illustrating changes in each color channel histogram due to the presence of defects.

Curves 1000, 1010 and 1020 represent the respective green, red and blue channel histograms for the bottle in FIG. 10A having no defects. Curves 1002, 1012 and 1022 represent the respective green, red and blue channel histograms for the bottle in FIG. 10B having a scratch. Curves 1004, 1014 and 1024 represent the respective green, red and blue channel histograms for the bottle in FIG. 10C having dirt particles. Each color channel histogram illustrates a similar behavior, with distribution widening when the bottle includes a defect.

Figure 11A:
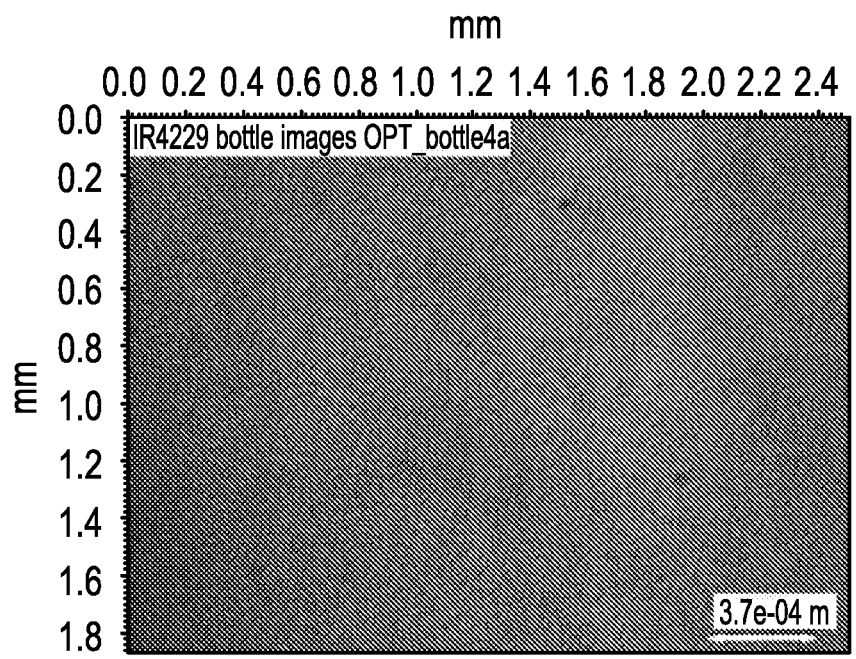
FIGS. 11A and 11B are example captured images of a portion of a bottle having no defect and a portion having a weld-line, respectively, according to an aspect of the present invention.
Figure 11B:
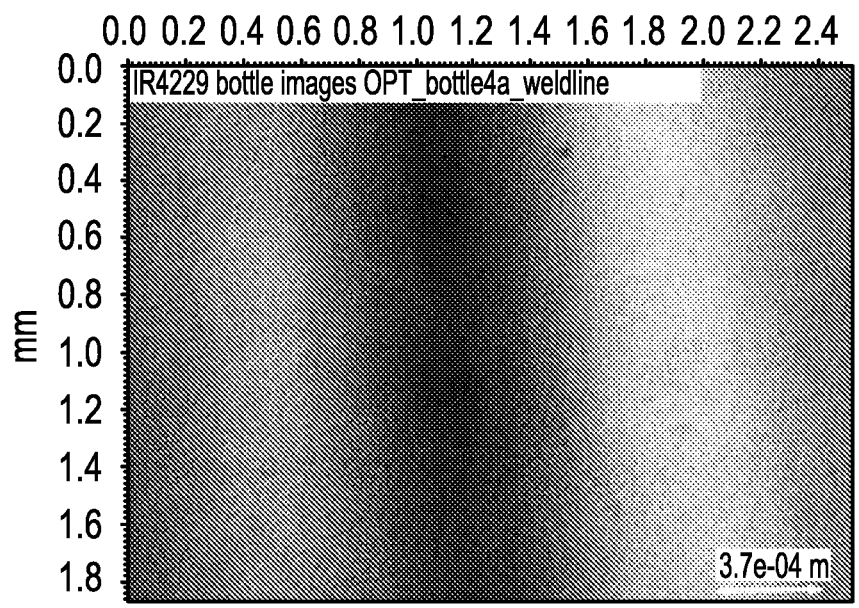

Another concern for thickness measurement accuracy is the presence of weld-lines (typical on glass bottles). FIGS. 11A and 11B are example captured optical images of a portion of a flint glass bottle having no defect (FIG. 11A) and the same bottle at a weld-line (FIG. 11B). The image shown in FIG. 11A was captured about 1 cm from the weld-line shown in FIG. 11B.

Figure 11C:
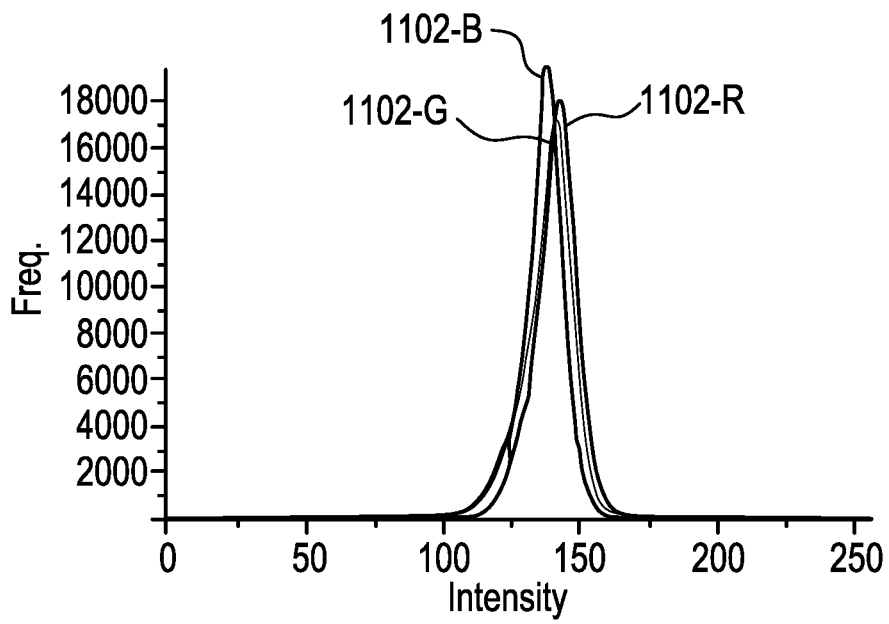
FIGS. 11C and 11D are example color channel histograms of the respective images shown in FIGS. 11A and 11B, illustrating the effect of weld-lines on the histograms, according to an aspect of the present invention.
Figure 11D:
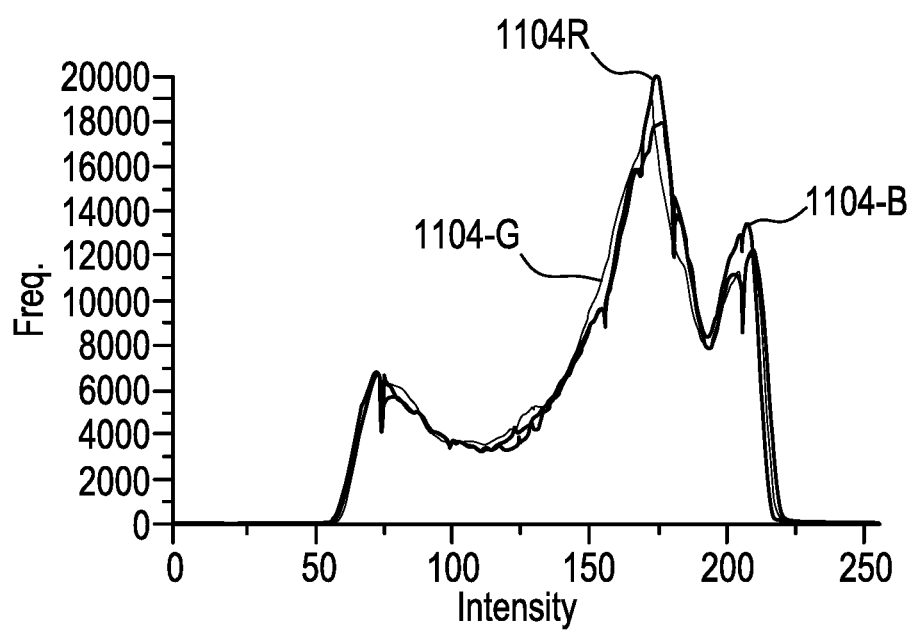

FIGS. 11C and 11D are example color channel histograms of the respective images shown in FIGS. 11A and 11B, illustrating the effect of weld-lines on the histograms. FIG. 11C illustrates red channel histogram 1102-R, green channel histogram 1102-G and blue channel histogram 1102-B for the image of FIG. 11A. FIG. 11D illustrates red channel histogram 1104-R, green channel histogram 1104-G and blue channel histogram 1104-B for the image of FIG. 11B. FIG. 11D shows that each color channel histogram (1104-R, 1104-G, 1104-B) for the weld-line pronounced bottle image (FIG. 11B) has a significantly different (and wider) distribution compared to the color channel histograms (1102-R, 1102-G, 1102-B) for the defect-free bottle image (FIG. 11A).

Figure 12A:
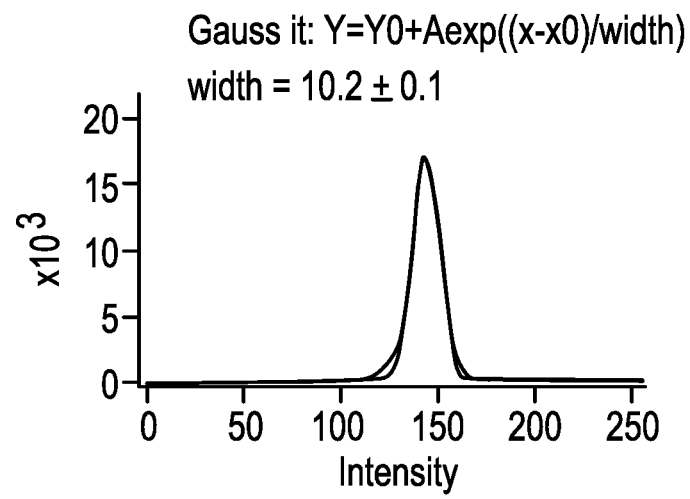
FIGS. 12A and 12B are graphs of Gaussian curves as a function of intensity (channel value) fitted to the average of the color channel histograms shown in respective FIGS. 11C and 11D, according to an aspect of the present invention.
Figure 12B:
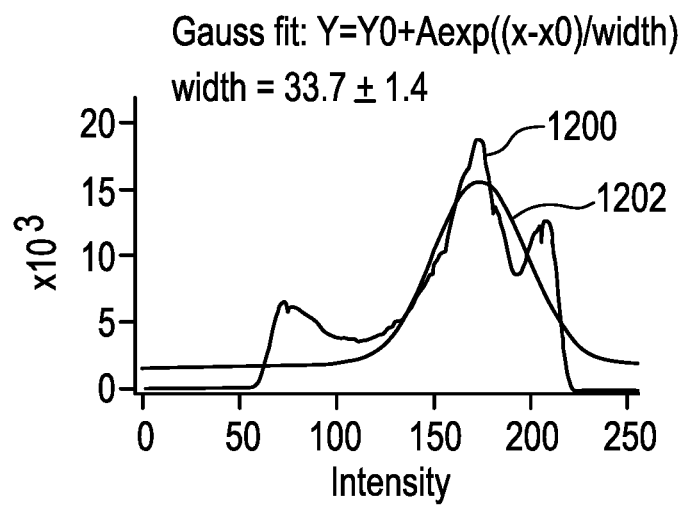

FIGS. 12A and 12B are graphs of Gaussian curves as a function of intensity (channel value) fitted to the average of the color channel histograms shown in respective FIGS. 11C and 11D. FIG. 12A represents a Gaussian-fitted curve for the defect free bottle image shown in FIG. 11A. FIG. 12B represents a Gaussian-fitted curve for the weld-line bottle image shown in FIG. 11B. In FIG. 12B, curve 1200 corresponds to the averaged histograms for the R, G, and B channels. Curve 1202 represents the Gaussian-fitted curve to averaged histogram curve 1200.

Figure 4:
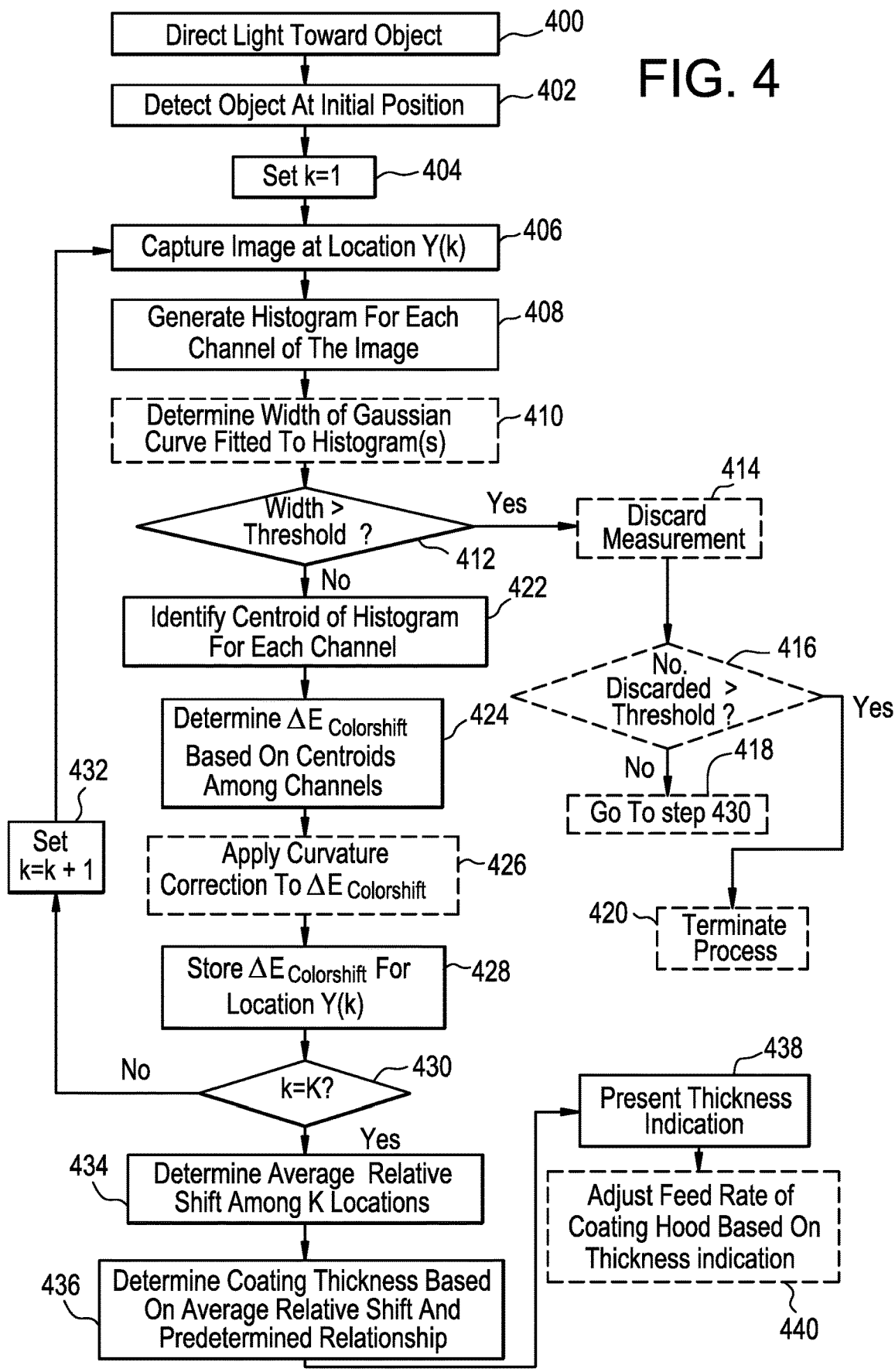
FIG. 4 is a flowchart diagram of an example method of measuring a thickness of a coating on an object, according to an aspect of the present invention.

Referring next to FIG. 4, a flowchart diagram is shown of an example method of measuring a thickness of a coating on object 120. FIG. 4 is discussed below with respect to FIGS. 1 and 3. In the method described in FIG. 4, object 120 is assumed to move at a predetermined speed on conveyor belt 122 along direction 124, such that object 120 moves past fixed light source(s) 102. The thickness measurement may be performed according to optical transmission imaging (as shown in FIG. 2B) or according to optical reflectance imaging (as shown in FIG. 2D).

FIG. 4 is described for the example of an RGB image (i.e., a three color channel image), but may also be applied to other color channels (for visible light and/or IR light), including any image 208 having at least two color channels. Furthermore, although step 406 below describes capturing a single image 208, two or more images may be simultaneously captured (such as shown in FIG. 2C) and processed in a similar manner as described below in steps 410-440 for the case of plural sequentially captured images.

At step 400, light is transmitted toward object 120, such as via light source(s) 102. Object 120 may move past light source(s) 102, such that at least a portion of the transmitted light is configured to interact with object 120 when object 120 reaches initial detection position 203. At step 402, object 120 is detected at initial detection position 203 (FIG. 2B), for example, by position detector 104. Position detector 104 may send detection signal 206 (FIG. 2A) to controller 108, responsive to the position detection step (step 402). At step 404, measurement location index k is set equal to 1, for example, by controller 108 responsive to detection signal 206 from position detector 104. Measurement location index k is an integer value from 1 to K (where K is greater than or equal to 1). Each measurement location index k represents a horizontal location along object 120 in direction 124.

At step 406, image 208 having two or more color channels may be captured at measurement location Y(k), for example, by detector 106. Measurement location Y(k) may represent location 205 (FIG. 2B), location 215 (FIG. 2D) or any of locations Y0-Y5 (FIG. 8). For example, controller 108, responsive to detection of object at initial detection position 203 (step 402) may cause detector 106 to capture KGB image 208 at measurement location Y(k). The image may be produced by the portion of the light (from light source(s) 102) that interacts with object 120 at measurement location Y(k). In an example, if only a single image is captured to determine the thickness measurement (i.e., the number of horizontal measurement locations K=1), measurement location Y(1) may correspond to the center of object 120 (along direction 124).

An RGB image 208, may include three matrices, one for each of the red, green and blue color channels. The number of columns and rows typically correspond to the pixel resolution of detector 106. The matrices contain integer numbers each representing a particular red, green, or blue value at a particular pixel.

At step 408, a color channel histogram may be generated for each color channel of image 208, for example, by histogram generator 302 of measurement device 110. Each color channel histogram may be determined by summing all pixels with a particular color channel value (e.g., red, green or blue value) and mapping the summed pixels as a function of the dynamic range of detector 106. The dynamic range is a measure of how fine of a color difference detector 106 may detect within a given light intensity window. For a 24 bit image, for example, with 8 bits for each color channel, detector 106 can measure $2^8$=256 shades of red, green, and blue. The dynamic range and performance of a detector 106 also depends on other factors such as how small of a charge each pixel may transfer, its noise level.

At optional step 410, a Gaussian curve may be fitted to one or more of the color channel histograms (step 408), for example, by optional defect detector 308. Defect detector 308 may determine the width of the Gaussian-fitted curve. At optional step 412, defect detector 308 may determine whether the distribution width is greater than predetermined defect threshold 316. A distribution greater than defect threshold 316 may indicate a defect such as dirt particles, one or more scratches or a weld-line.

If, at optional step 412, the distribution width is greater than defect threshold 316, step 412 proceeds to optional step 414 and the measurement at location Y(k) is discarded, for example, by defect detector 308 or controller 108. Optional step 414 may proceed to step 416. At optional step 416, the number of discarded measurements (e.g., based on defect indication 318) may be compared to a predetermined threshold (for example if more than one thickness measurement is determined for object 120), for example, by controller 108. If controller 108 determines, at step 416, that the number of discarded measurements is greater than the threshold, step 416 proceeds to step 420, and the process is terminated.

If controller 108 determines, at step 416, that the number of discarded measurements is less than or equal to the predetermined threshold, step 416 proceeds to step 418 and the process continues at step 430 (for the next measurement location).

If, at optional step 412, it is determined that the distribution width of one or more color channel histograms is less than defect threshold 316, step 412 proceeds to step 422. At step 422, the centroid of each color channel histogram may be identified, for example, by color shift analyzer 304. Each centroid position (e.g., $C_r$, $C_g$, $C_b$) may be determined by multiplying all respective color channel pixels by their dynamic range values, adding the result, and subsequently dividing the summation by the number of color channel pixels.

At step 424, color shift analyzer 304 determines the relative color shift $\Delta E_{ColorShift}$ between each of the color channels based on the centroid positions (step 422). First, color shift analyzer 304 determines the relative centroid position shifts, by calculating the differences $C_r$–$C_b$, $C_r$–$C_g$, and $C_b$–$C_g$. The centroid position shifts are applied to equation 5. Specifically, all centroid position shifts are squared. Then, the square root of the sum of squares is determined. In some examples, the relative color shift (equation 5) may be multiplied by 100 and provided as a percentage.

At optional step 426, curvature correction value 310 may be applied to the relative color shift $\Delta E_{colorShift}$, by color shift analyzer 304, for example, based on measurement location Y(k) and a predetermined shape of object 120, according to a calibration standard.

At step 428, controller 108 may store the relative color shift $\Delta E_{colorShift}$ for location Y(k) in storage 116. At step 430, controller 108 determines whether measurement location index k is equal to K.

If controller 108 determines, at step 430, that index k is not equal to K, step 430 proceeds to step 432. At step 432, controller 108 increments measurement index k to k+1, and step 432 proceeds to step 406. Steps 406-432 are repeated until index k is equal to K.

If controller 108 determines, at step 430, that index k is equal to K, step 430 proceeds to step 434. At step 434, color shift analyzer 304 (or controller 108) determines an average relative color shift among the K measurement locations based on the stored relative color shifts (step 428) for each measurement location.

At step 436, thickness calculator 306 determines the coating thickness on object 120 based on the average relative color shift (step 434) using predetermined relationship 312 between relative color shift and coating thickness. It is understood that step 434 may not be performed when K=1 (i.e., for a thickness measurement using a single measurement location on object 120). Alternatively, thickness calculator 306, at step 436, may determine whether the coating is within an acceptable range, without determining the actual coating thickness.

At step 438, thickness indication 314 is presented, for example, via display 112 based on the thickness determined in step 436. Thickness indication 314 may include the determined thickness, an indication that the determined thickness is within a predetermined thickness range, or an indication the determined thickness is out of the predetermined thickness range.

At optional step 440, a feed rate of a coating compound for injector(s) 128 of coating hood 126 may be adjusted based on thickness indication 314, for example, by controller 108 (e.g., automatically) or by user input via user interface 114 (in conjunction with controller 108).

It is contemplated that a non-transitory computer readable medium may store computer readable instructions for machine execution of the steps 400-440.

Although the invention has been described in terms of methods and apparatus for optically measuring a film thickness of a coating deposited on a substrate, it is contemplated that one or more steps and/or components may be implemented in software for use with microprocessors/general purpose computers (not shown). In this embodiment, one or more of the functions of the various components and/or steps described above may be implemented in software that controls a computer. The software may be embodied in non-transitory tangible computer readable media (such as, by way of non-limiting example, a magnetic disk, optical disk, hard drive, etc.) for execution by the computer. As described herein, devices 104, 106, 110, 112 and 114, shown in FIG. 1, may perform certain operations using dedicated circuitry and/or using software contained in computer-readable medium 116 coupled to controller 108. The software instructions may cause controller 108 and/or measurement device 110 to perform one or more processes described herein. Alternatively, hardwired circuitry may be used in place of, or in combination with, software instructions to implement processes described herein. Thus, implementations described herein are not limited to any specific combination of hardware circuitry and software.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An apparatus for measuring a thickness of a coating on an object, the apparatus comprising:
    at least one light source configured to direct light toward the object at a predetermined location on the object, a portion of the light interacting with the object;
    a detector configured to capture an image comprising at least three wavelength channels produced by the portion of the light interacting with the object, wherein each of the at least three wavelength channels is a color channel;
    a measurement device coupled to the detector configured to: (i) determine a relative color shift between the at least three wavelength channels of the image based on a histogram of each wavelength channel of the at least three wavelength channels of the image, and, (ii) based on a square root of a sum of squared differences between a centroid of each the at least three color channels of the image, determine at least one of the thickness or an acceptability of the coating on the object.

2. The apparatus of claim 1, further comprising a display configured to display at least one of the determined thickness, an indication that the determined thickness is acceptable, or an indication the determined thickness is not acceptable.

3. The apparatus of claim 1, wherein the measurement device is configured to: compare a characteristic of each histogram to a predetermined defect threshold, and determine the thickness of the coating when the characteristic of each histogram is less than the predetermined defect threshold, wherein the defect threshold corresponds to at least one of a dirt indication, a scratch indication or a weld-line indication.

4. The apparatus of claim 1, wherein the portion of the light interacting with the object includes at least one of the portion of the light passing through the object or the portion of the light reflected from the object.

5. The apparatus of claim 1, further comprising: a controller coupled to the at least one light source, the detector, and the measurement device, the controller configured to control the light source, the detector, and the measurement device, such that the measurement device determines a plurality of relative color shifts from respective plural images corresponding to plural locations on the object, wherein the measurement device additionally determines the thickness of the coating on the object based on an average relative color shift from the plurality of relative color shifts, and the plural images corresponding to the plural locations are captured sequentially, simultaneously or a combination thereof.

6. The apparatus of claim 1, wherein the object moves at a predetermined speed in a first direction and the measurement device is configured to determine movement of the object in a second direction orthogonal to the first direction based on a characteristic of the captured image.

7. The apparatus of claim 1, wherein the thickness of the coating on the object is determined based on a predetermined relationship between the determined relative color shift and coating thickness.

8. The apparatus of claim 1, wherein the light source is configured to transmit at least one of visible light or infrared light.

9. The apparatus of claim 1, further comprising a position sensor configured to detect that the object is at the predetermined location.

10. The apparatus of claim 1, wherein the apparatus further comprises a coating hood.

11. The apparatus of claim 1, wherein a material of the coating is selected from a group consisting of monobutylinchloride, metal oxide, titanium, tin, and organometallic compound.

12. A method of measuring a thickness of a coating on an object, the method comprising:
    (a) directing light toward the object at a predetermined location on the object, a portion of the light interacting with the object;
    (b) capturing an image comprising at least three color channels produced by the portion of the light interacting with the object;
    (c) generating a histogram of each color channel of the at least three color channels of the image;
    (d) identifying, for each color channel of the image, a centroid of the respective histogram;
    (e) determining a relative color shift between the at least three color channels based on a difference between each centroid of the at least three color channels; and
    (f) determining (i) at least one of the thickness or (ii) an acceptability of the coating on the object, said determining step (f) being based a square root of a sum of squared differences between each centroid of the at least three color channels of the image.

13. The method of claim 12, the method further comprising:
    repeating the directing of the light, the capturing of the image, and the determining of the relative color shift for plural locations on the object; determining an average relative color shift for the plural locations on the object; and additionally determining the thickness of the coating on the object based on the average relative color shift.

14. The method of claim 13, wherein plural images corresponding to the plural locations are captured sequentially, simultaneously or a combination thereof.

15. The method of claim 12, wherein the portion of the light interacting with the object includes at least one of the portion of the light passing through the object or the portion of the light reflected from the object.

16. The method of claim 12, the method further comprising: comparing a characteristic of each histogram to a predetermined defect threshold, and determining the thickness of the coating when the characteristic of each histogram is less than the predetermined defect threshold, wherein the defect threshold corresponds to at least one of a dirt indication, a scratch indication or a weld-line indication.

17. The method of claim 12, the determining of the relative color shift further comprising: applying a curvature correction value to the relative color shift based on the predetermined location on the object, to form a curvature corrected color shift, and wherein the thickness of the coating on the object is determined based on the curvature corrected color shift.

18. The method of claim 12, the method further comprising: presenting at least one of the determined thickness, an indication that the determined thickness is acceptable, or an indication the determined thickness is not acceptable.

19. The method of claim 12, wherein the determining of the thickness includes determining the thickness of the coating on the object based on a predetermined relationship between the determined relative color shift and coating thickness.

20. The method of claim 12, wherein a material of the coating is selected from a group consisting of monobutylinchloride, metal oxide, titanium, tin, and organometallic compound.

21. The method of claim 12, wherein the method is performed following a coating process at a hot end of the system.

22. The method of claim 12, further comprising adjusting a feed rate of the coating, which is sprayed by an injector onto the object, when the determined thickness of the coating is out of a predetermined thickness range.

\* \* \* \* \*